(12) United States Patent
Dubois et al.

(10) Patent No.: US 11,142,280 B2
(45) Date of Patent: Oct. 12, 2021

(54) BICYCLE CRANK WITH SPINDLE ATTACHMENT STRUCTURE

(71) Applicant: The Hive Global, Inc, Taichung (TW)

(72) Inventors: George Dubois, San Luis Obispo, CA (US); Joel Peters, Taichung (TW)

(73) Assignee: The Hive Global, Inc., Taichung (TW)

( * ) Notice: Subject to any disclaimer, the term of this patent is extended or adjusted under 35 U.S.C. 154(b) by 0 days.

(21) Appl. No.: 15/462,359

(22) Filed: Mar. 17, 2017

(65) Prior Publication Data

US 2017/0274960 A1    Sep. 28, 2017

Related U.S. Application Data

(60) Provisional application No. 62/313,024, filed on Mar. 24, 2016.

(51) Int. Cl.
| | | |
|---|---|---|
| *B62M 3/00* | (2006.01) | |
| *F16D 1/06* | (2006.01) | |
| *F16D 1/108* | (2006.01) | |
| *F16D 1/08* | (2006.01) | |
| *F16D 1/10* | (2006.01) | |

(52) U.S. Cl.
CPC .............. *B62M 3/00* (2013.01); *B62M 3/003* (2013.01); *F16D 1/0852* (2013.01); *F16D 1/101* (2013.01); *F16D 1/108* (2013.01); *F16D 2001/103* (2013.01)

(58) Field of Classification Search
CPC .. B62M 3/00; B62M 3/003; B62M 2003/006; F16D 1/0852; F16D 1/101; F16D 1/108; F16D 2001/103
See application file for complete search history.

(56) References Cited

U.S. PATENT DOCUMENTS

| | | |
|---|---|---|
| 512,729 A | 1/1894 | Lucas et al. |
| 527,384 A | 10/1894 | Davids |
| 527,520 A | 10/1894 | Copeland |
| 547,639 A | 10/1895 | Grubb |
| 575,712 A | 1/1897 | Hamilton |
| 576,548 A | 2/1897 | Cassidy |

(Continued)

FOREIGN PATENT DOCUMENTS

| | | |
|---|---|---|
| AT | 397641 B | 5/1994 |
| CN | 2115968 U | 9/1992 |

(Continued)

OTHER PUBLICATIONS

Machine translation of DE 19751879 A1 obtained on Dec. 6, 2018.*

(Continued)

*Primary Examiner* — Adam D Rogers
(74) *Attorney, Agent, or Firm* — Haverstock & Owens LLP

(57) ABSTRACT

A composite bicycle crank with an integral spindle attachment structure provides a unique method for attaching a bicycle crank arm to a bicycle crank spindle, and also for attaching a bicycle crank arm to a crank arm insert. A light-weight crank arm is able to be manufactured separately from the crank spindle or insert, and then securely attached after both pieces have been made. This allows for the pieces of the crank assembly to be manufactured from one or more different materials, and securely connected after manufacturing, to create a lower weight assembly than would be possible otherwise.

25 Claims, 18 Drawing Sheets

(56) References Cited

U.S. PATENT DOCUMENTS

| | | | |
|---|---|---|---|
| 579,479 A | 3/1897 | Gobbler | |
| 590,685 A | 9/1897 | Matthews | |
| 595,388 A | 12/1897 | Hanson | |
| 598,325 A | 2/1898 | McIntyre | |
| 614,900 A | 11/1898 | Seaver | |
| 616,167 A | 12/1898 | Walker | |
| 620,266 A | 2/1899 | Woodiska | |
| 658,400 A | 9/1900 | Roberts | |
| 666,679 A | 1/1901 | Kraus | |
| 1,070,971 A | 8/1913 | Lowd | |
| 1,325,206 A | 12/1919 | Raybon | |
| 1,400,131 A | 12/1921 | Adams | |
| 1,535,601 A | 4/1925 | Graham | |
| 1,636,327 A | 7/1927 | Roe | |
| 2,015,430 A * | 9/1935 | Matthews | B23F 5/22 403/359.6 |
| 2,024,499 A | 12/1935 | Baron | |
| 2,228,770 A * | 1/1941 | Le Tourneau | F16D 1/092 403/334 |
| 2,317,070 A * | 4/1943 | Le Tourneau | F16D 1/092 403/255 |
| 2,567,785 A | 9/1951 | Rieger | |
| 2,568,443 A | 9/1951 | Gerner | |
| 2,751,797 A | 6/1956 | Pearl | |
| 3,184,993 A | 5/1965 | Swenson | |
| 3,185,439 A | 5/1965 | Inaba | |
| 3,303,720 A | 2/1967 | Jaulmes | |
| D208,683 S | 9/1967 | Schreckengost | |
| 3,382,734 A | 5/1968 | Hussey | |
| 3,416,385 A | 12/1968 | Schenk | |
| 3,477,303 A | 11/1969 | Brilando | |
| 3,485,113 A | 12/1969 | Adcock | |
| 3,592,076 A | 7/1971 | Baginski | |
| 3,760,653 A | 9/1973 | Hagenah | |
| 3,785,129 A | 1/1974 | Anthamatten | |
| 3,807,255 A | 4/1974 | Baginski | |
| 3,811,339 A | 5/1974 | Konzorr | |
| 3,869,138 A | 3/1975 | Allison | |
| 3,910,136 A | 10/1975 | Juy | |
| 3,933,373 A | 1/1976 | Gammelgaard | |
| 3,964,343 A | 6/1976 | Lauterbach | |
| 3,973,447 A | 8/1976 | Nagano | |
| 4,016,357 A | 4/1977 | Abrahamsen | |
| 4,044,621 A | 8/1977 | McGregor, Sr. | |
| 4,078,444 A | 3/1978 | Huret | |
| 4,089,236 A | 5/1978 | Genzling | |
| 4,093,325 A | 6/1978 | Troccaz | |
| 4,135,727 A | 1/1979 | Camagnolo | |
| 4,237,743 A | 12/1980 | Nagano | |
| 4,240,303 A | 12/1980 | Mosley | |
| 4,269,084 A | 5/1981 | Okajima | |
| 4,298,210 A | 11/1981 | Lotteau | |
| 4,302,987 A | 12/1981 | Takeda | |
| 4,330,137 A | 5/1982 | Nagano | |
| 4,337,933 A | 7/1982 | Egami | |
| 4,377,952 A | 3/1983 | Gamondes | |
| 4,380,445 A | 4/1983 | Shimano | |
| 4,398,434 A | 8/1983 | Kimura | |
| 4,433,963 A | 2/1984 | Shimano | |
| 4,439,172 A | 3/1984 | Segawa | |
| 4,441,383 A | 4/1984 | Segawa | |
| 4,442,732 A | 4/1984 | Okajima | |
| 4,445,289 A | 5/1984 | Beneteau | |
| 4,445,397 A | 5/1984 | Shimano | |
| 4,472,163 A | 9/1984 | Bottini | |
| 4,475,894 A | 10/1984 | Sugino | |
| 4,487,424 A | 12/1984 | Ellis | |
| 4,488,453 A | 12/1984 | Drugeon | |
| 4,498,890 A | 2/1985 | Sutherland | |
| 4,506,463 A | 3/1985 | Chassing | |
| 4,507,105 A | 3/1985 | Stottmann | |
| 4,515,386 A | 5/1985 | Tsujimura | |
| 4,523,492 A | 6/1985 | Shimano | |
| 4,538,480 A | 9/1985 | Trindle | |
| 4,548,422 A | 10/1985 | Michel et al. | |
| 4,573,950 A | 3/1986 | Nagano | |
| 4,608,878 A | 9/1986 | Shimano | |
| 4,632,416 A | 12/1986 | Zelenetz | |
| 4,639,240 A | 1/1987 | Liu | |
| 4,640,151 A | 2/1987 | Howell | |
| 4,646,586 A | 3/1987 | Raposarda | |
| 4,662,862 A | 5/1987 | Matson | |
| 4,665,767 A | 5/1987 | Lassche | |
| 4,686,867 A | 8/1987 | Bernard | |
| 4,704,919 A | 11/1987 | Durham | |
| 4,735,107 A | 4/1988 | Winkle | |
| D298,613 S | 11/1988 | McMurtey | |
| 4,791,692 A | 12/1988 | Collins | |
| 4,803,894 A | 2/1989 | Howell | |
| 4,811,626 A | 3/1989 | Bezin | |
| 4,815,333 A | 3/1989 | Sampson | |
| 4,827,633 A | 5/1989 | Feldstein | |
| 4,832,667 A | 5/1989 | Wren | |
| 4,838,115 A | 6/1989 | Nagano | |
| 4,840,085 A | 6/1989 | Nagano | |
| 4,854,924 A | 8/1989 | Nagano | |
| 4,856,801 A | 8/1989 | Hollingsworth | |
| 4,873,890 A | 10/1989 | Nagano | |
| 4,882,946 A | 11/1989 | Beyl | |
| 4,893,523 A | 1/1990 | Lennon | |
| 4,898,063 A | 2/1990 | Sampson | |
| 4,900,050 A | 2/1990 | Bishop et al. | |
| 4,905,541 A | 3/1990 | Alan | |
| 4,923,324 A * | 5/1990 | Favrou | F16D 1/08 403/298 |
| 4,928,549 A | 5/1990 | Nagano | |
| 4,932,287 A | 6/1990 | Ramos | |
| 4,947,708 A | 8/1990 | Lacomb | |
| 4,986,949 A | 1/1991 | Trimble | |
| 5,002,520 A | 3/1991 | Greenlaw | |
| 5,003,841 A | 4/1991 | Nagano | |
| 5,014,571 A | 5/1991 | Dapezi | |
| 5,018,564 A | 5/1991 | Anglin | |
| 5,019,312 A | 5/1991 | Bishop | |
| 5,046,382 A | 9/1991 | Steinberg | |
| 5,048,369 A | 9/1991 | Chen | |
| 5,060,537 A | 10/1991 | Nagano | |
| 5,067,930 A | 11/1991 | Morales | |
| D323,309 S | 1/1992 | Perry | |
| 5,115,692 A | 5/1992 | Nagano | |
| 5,121,935 A | 6/1992 | Mathieu et al. | |
| 5,125,288 A | 6/1992 | Amiet | |
| 5,179,873 A | 1/1993 | Girvin | |
| 5,188,384 A | 2/1993 | van Raemdonck | |
| 5,194,051 A | 3/1993 | Nagano | |
| 5,195,397 A | 3/1993 | Nagano | |
| 5,203,229 A | 4/1993 | Chen | |
| 5,207,768 A * | 5/1993 | Gluys | F16D 1/0876 192/109 R |
| 5,209,581 A * | 5/1993 | Nagano | B62M 3/003 384/431 |
| 5,215,322 A | 6/1993 | Enders | |
| 5,259,270 A | 11/1993 | Lin | |
| 5,320,582 A | 6/1994 | Takeda | |
| 5,326,331 A | 7/1994 | Hallock, III | |
| 5,379,665 A | 1/1995 | Nagano | |
| D355,872 S | 2/1995 | Haney | |
| 5,419,218 A | 5/1995 | Romano | |
| 5,423,233 A | 6/1995 | Peyre | |
| 5,435,869 A | 7/1995 | Christensen | |
| 5,451,071 A | 9/1995 | Pong et al. | |
| 5,460,576 A | 10/1995 | Barnett | |
| 5,496,222 A | 3/1996 | Kojima | |
| 5,497,680 A | 3/1996 | Nagano | |
| 5,505,111 A | 4/1996 | Nagano | |
| 5,522,282 A | 6/1996 | Nagano | |
| 5,540,118 A | 7/1996 | Calendrille, Jr. | |
| 5,544,907 A | 8/1996 | Lin et al. | |
| 5,549,396 A | 8/1996 | Chiang | |
| 5,620,384 A | 4/1997 | Kojima | |
| 5,626,060 A | 5/1997 | Lin | |
| 5,632,940 A | 5/1997 | Whatley | |
| 5,644,953 A | 7/1997 | Leng | |
| 5,676,616 A | 10/1997 | Hare | |

(56) References Cited

U.S. PATENT DOCUMENTS

| | | |
|---|---|---|
| 5,679,084 A | 10/1997 | Daniels, III |
| 5,687,619 A | 11/1997 | Bryne |
| 5,725,450 A | 3/1998 | Huskey |
| 5,727,429 A | 3/1998 | Ueda |
| 5,728,018 A | 3/1998 | Terada |
| 5,765,450 A | 6/1998 | Kruger |
| 5,771,757 A | 6/1998 | Hanamura |
| 5,782,714 A | 7/1998 | Osgood |
| 5,791,202 A | 8/1998 | Karsdon |
| 5,803,476 A | 9/1998 | Olson et al. |
| 5,806,379 A | 9/1998 | Nagano |
| 5,809,844 A | 9/1998 | Durham |
| 5,819,599 A | 10/1998 | Yamanaka |
| 5,846,148 A | 12/1998 | Fuji |
| 5,893,299 A | 4/1999 | Yamanaka |
| 5,927,155 A | 7/1999 | Jackson |
| 5,941,135 A | 8/1999 | Schlanger |
| 5,943,795 A | 8/1999 | Ueda |
| 5,954,604 A | 9/1999 | Nakamura |
| 6,003,889 A | 12/1999 | Shalom |
| 6,014,913 A | 1/2000 | Masahiro |
| 6,014,914 A | 1/2000 | Ueda |
| 6,039,665 A | 3/2000 | Nakamura |
| 6,058,803 A | 5/2000 | Yamanaka |
| 6,059,171 A | 5/2000 | Yamanaka et al. |
| 6,059,378 A * | 5/2000 | Dougherty ............ B21K 25/00 301/124.1 |
| 6,060,982 A | 5/2000 | Holtrop |
| 6,083,132 A | 7/2000 | Walker |
| 6,095,691 A | 8/2000 | Chiang |
| 6,117,032 A | 9/2000 | Nankou |
| 6,165,092 A | 12/2000 | Bramham |
| 6,202,506 B1 | 3/2001 | Storck et al. |
| 6,203,459 B1 | 3/2001 | Calendrille, Jr. |
| 6,264,575 B1 | 7/2001 | Lim |
| 6,266,990 B1 | 7/2001 | Shook et al. |
| 6,305,243 B1 | 10/2001 | Chiang |
| 6,314,834 B1 | 11/2001 | Smith et al. |
| 6,332,853 B1 | 12/2001 | Bowman |
| 6,354,973 B1 | 3/2002 | Barnett |
| 6,416,434 B1 | 7/2002 | Calendrille, Jr. |
| 6,490,948 B2 | 12/2002 | Tanaka |
| 6,520,048 B2 | 2/2003 | Chen |
| 6,533,690 B2 | 3/2003 | Barnett |
| 6,564,675 B1 | 5/2003 | Jiang |
| 6,612,201 B1 | 9/2003 | Chen |
| 6,637,292 B2 | 10/2003 | Chu |
| 6,647,826 B2 | 11/2003 | Okajima |
| 6,725,742 B2 | 4/2004 | Bremer |
| 6,729,204 B1 | 5/2004 | Chen |
| 6,805,373 B2 | 10/2004 | Singenberger et al. |
| 6,848,700 B1 | 2/2005 | Fritschen |
| 6,988,427 B2 | 1/2006 | Yamanaka |
| 7,013,754 B2 | 3/2006 | Milanowski |
| 7,024,961 B2 | 4/2006 | Hsiao |
| D522,414 S | 6/2006 | Chen |
| 7,059,983 B2 | 6/2006 | Heim |
| 7,066,856 B1 | 6/2006 | Rogers |
| 7,066,857 B1 | 6/2006 | DeRosa |
| D524,195 S | 7/2006 | Neal |
| 7,108,428 B2 | 9/2006 | Ason |
| 7,174,807 B2 | 2/2007 | Bryne |
| 7,240,587 B2 | 7/2007 | Plassiard |
| 7,263,914 B2 | 9/2007 | Ording et al. |
| 7,334,500 B2 * | 2/2008 | Tseng .................. B62M 3/00 74/594.1 |
| 7,523,685 B2 | 4/2009 | French |
| 7,562,604 B2 | 7/2009 | Fukui |
| 7,610,832 B2 | 11/2009 | Dal Pra' |
| 7,650,817 B2 | 1/2010 | Shiraishi et al. |
| 7,753,157 B1 | 7/2010 | Woods |
| 7,770,492 B2 | 8/2010 | French |
| 7,886,947 B2 | 2/2011 | Campagnolo |
| 7,959,529 B2 | 6/2011 | Braedt |
| 8,024,993 B2 | 9/2011 | Dal Pra' et al. |
| 8,025,304 B2 * | 9/2011 | Smith .................. B62M 3/003 280/259 |
| 8,066,293 B2 | 11/2011 | Meggiolan |
| 8,197,371 B2 | 6/2012 | D'Aluisio |
| 8,235,849 B2 | 8/2012 | Carnston et al. |
| 8,302,504 B2 | 11/2012 | Dal Pra' |
| 8,491,429 B2 | 7/2013 | Cranston et al. |
| 8,561,500 B2 | 10/2013 | D'Aluisio |
| 8,578,816 B2 | 11/2013 | Lin |
| 8,590,421 B2 | 11/2013 | Meggiolan et al. |
| 8,616,084 B2 | 12/2013 | Meggiolan |
| 8,641,151 B2 | 2/2014 | Kamada |
| 8,663,044 B2 | 3/2014 | Lin |
| 8,689,662 B2 | 4/2014 | Pasqua et al. |
| 8,707,823 B2 | 4/2014 | Dal Pra' |
| 8,770,061 B2 | 7/2014 | Meggiolan et al. |
| 8,820,192 B2 | 9/2014 | Staples et al. |
| 8,863,616 B2 | 10/2014 | Ciavatta et al. |
| 8,911,314 B2 | 12/2014 | Braedt |
| 9,011,282 B2 | 4/2015 | Staples |
| 9,458,871 B2 * | 10/2016 | Ishizaki .................. B62D 1/20 |
| 10,259,526 B2 * | 4/2019 | Hsieh ...................... B62M 3/08 |
| 10,260,568 B2 * | 4/2019 | Chen ...................... B62M 1/36 |
| 2001/0049976 A1 | 12/2001 | Dodman |
| 2002/0028719 A1 | 3/2002 | Yamanaka |
| 2002/0160869 A1 | 10/2002 | Barnett |
| 2002/0170382 A1 | 11/2002 | Yang |
| 2002/0194951 A1 | 12/2002 | Lowe |
| 2003/0029271 A1 | 2/2003 | Shuman |
| 2003/0041689 A1 | 3/2003 | Chu |
| 2003/0051576 A1 | 3/2003 | Muraoka |
| 2003/0064844 A1 | 4/2003 | Lin |
| 2003/0183036 A1 | 10/2003 | Chou |
| 2003/0197346 A1 | 10/2003 | Singenberger et al. |
| 2004/0009835 A1 | 1/2004 | Heim |
| 2004/0037628 A1 * | 2/2004 | Meggiolan ............... B62M 3/00 403/258 |
| 2004/0182197 A1 | 9/2004 | Chiang |
| 2004/0187635 A1 | 9/2004 | Bryne |
| 2004/0200314 A1 | 10/2004 | Hermansen et al. |
| 2004/0211289 A1 | 10/2004 | Chiang et al. |
| 2004/0254038 A1 | 12/2004 | Chamberlain |
| 2005/0005729 A1 | 1/2005 | Chen |
| 2005/0012298 A1 | 1/2005 | Dal Pra et al. |
| 2005/0016323 A1 | 1/2005 | Dal Pra' |
| 2005/0022625 A1 | 2/2005 | Nonoshita |
| 2005/0032596 A1 | 2/2005 | Nonoshita et al. |
| 2005/0035571 A1 | 2/2005 | Huck |
| 2005/0081679 A1 | 4/2005 | Chen |
| 2005/0145061 A1 | 7/2005 | Ording et al. |
| 2005/0178236 A1 | 8/2005 | Crozet et al. |
| 2005/0199092 A1 | 9/2005 | Feltrin et al. |
| 2005/0217417 A1 | 10/2005 | Uchida et al. |
| 2005/0252337 A1 | 11/2005 | Chen |
| 2005/0284253 A1 | 12/2005 | Hervig |
| 2006/0029317 A1 | 2/2006 | Yamamoto |
| 2006/0075846 A1 | 4/2006 | Valle |
| 2006/0081088 A1 | 4/2006 | Muraoka |
| 2006/0169098 A1 | 8/2006 | Valle |
| 2006/0199690 A1 | 9/2006 | Gardner |
| 2006/0236809 A1 | 10/2006 | Bryne |
| 2006/0258499 A1 | 11/2006 | Kamada |
| 2006/0266154 A1 | 11/2006 | Hermansen |
| 2006/0288819 A1 | 12/2006 | Dal Pra' et al. |
| 2007/0034043 A1 * | 2/2007 | Feltrin .................. B62K 19/16 74/594.1 |
| 2007/0049436 A1 | 3/2007 | Kamada |
| 2007/0134456 A1 | 6/2007 | Fritschen |
| 2007/0137426 A1 | 6/2007 | Meggiolan et al. |
| 2007/0137432 A1 | 6/2007 | Chen |
| 2007/0182122 A1 | 8/2007 | Smith |
| 2007/0199403 A1 | 8/2007 | Ciavatta et al. |
| 2007/0204720 A1 | 9/2007 | Poyzer |
| 2007/0204722 A1 | 9/2007 | Dal Pra |
| 2007/0207631 A1 | 9/2007 | Meggiolan et al. |
| 2007/0283781 A1 | 12/2007 | Meggiolan |
| 2007/0284782 A1 | 12/2007 | Dal Pra' |
| 2007/0289406 A1 | 12/2007 | French |
| 2007/0289407 A1 | 12/2007 | French |

(56) References Cited

U.S. PATENT DOCUMENTS

| | | | |
|---|---|---|---|
| 2008/0004143 A1 | 1/2008 | Kanehisa | |
| 2008/0005905 A1 | 1/2008 | Valle et al. | |
| 2008/0152460 A1 | 6/2008 | Watanabe | |
| 2008/0224440 A1 | 9/2008 | Masuda et al. | |
| 2008/0231014 A1 | 9/2008 | Braedt | |
| 2008/0234082 A1 | 9/2008 | Braedt | |
| 2008/0272572 A1 | 11/2008 | Tsai | |
| 2008/0289927 A1 | 11/2008 | Ji | |
| 2008/0307652 A1 | 12/2008 | Chiang | |
| 2009/0042682 A1 | 2/2009 | Dal Pra | |
| 2009/0056495 A1 | 3/2009 | Bischoff et al. | |
| 2009/0056496 A1 | 3/2009 | Dodman et al. | |
| 2009/0078081 A1 | 3/2009 | French | |
| 2009/0145262 A1 | 6/2009 | Pasqua et al. | |
| 2009/0151509 A1 | 6/2009 | French | |
| 2009/0236777 A1 | 9/2009 | Chiang | |
| 2009/0261553 A1 | 10/2009 | Meggiolan | |
| 2010/0058889 A1 | 3/2010 | Dal Pra | |
| 2010/0064845 A1 | 3/2010 | French | |
| 2010/0229675 A1 | 9/2010 | Dodman et al. | |
| 2010/0236356 A1 | 9/2010 | Dodman | |
| 2010/0275724 A1 | 11/2010 | Staples et al. | |
| 2010/0295265 A1 | 11/2010 | Burdick | |
| 2011/0011202 A1 | 1/2011 | Lin | |
| 2011/0105263 A1 | 5/2011 | Braedt | |
| 2011/0130233 A1 | 6/2011 | Tokuyama | |
| 2011/0140390 A1 | 6/2011 | Kuroiwa et al. | |
| 2011/0290069 A1 | 12/2011 | Lin | |
| 2012/0119565 A1 | 5/2012 | Kamada | |
| 2012/0225745 A1 | 9/2012 | Oishi | |
| 2012/0260767 A1 | 10/2012 | D'Aluisio | |
| 2012/0302384 A1 | 11/2012 | Braedt | |
| 2013/0053195 A1 | 2/2013 | Emura et al. | |
| 2013/0053196 A1 | 2/2013 | Emura et al. | |
| 2013/0068066 A1 | 3/2013 | Staples et al. | |
| 2013/0114999 A1* | 5/2013 | Ostling | E21B 17/03 403/359.1 |
| 2013/0225343 A1 | 8/2013 | Spahr et al. | |
| 2014/0179474 A1 | 6/2014 | Florczyk | |
| 2014/0345419 A1 | 11/2014 | Staples et al. | |
| 2015/0024884 A1 | 1/2015 | Braedt | |
| 2015/0210353 A1 | 7/2015 | Tokuyama et al. | |
| 2016/0167737 A1 | 6/2016 | Tokuyama | |
| 2016/0176447 A1 | 6/2016 | Bernardele | |
| 2016/0236749 A1 | 8/2016 | Cody | |
| 2016/0272002 A1 | 9/2016 | Earie | |
| 2017/0057598 A1 | 3/2017 | Thrash et al. | |
| 2017/0101124 A1* | 4/2017 | Assmann | B62D 1/10 |
| 2017/0314665 A1 | 11/2017 | Garcia | |
| 2018/0022415 A1 | 1/2018 | Oishi | |
| 2018/0297664 A1 | 10/2018 | Fukumori | |
| 2018/0346064 A1 | 12/2018 | Fujita | |
| 2019/0233051 A1* | 8/2019 | Carrasco Vergara | B62M 3/003 |
| 2019/0241233 A1* | 8/2019 | Tavares Miranda | B62M 3/00 |
| 2020/0354016 A1* | 11/2020 | Di Serio | B21K 17/00 |

FOREIGN PATENT DOCUMENTS

| | | | |
|---|---|---|---|
| CN | 1080902 A | 1/1994 | |
| CN | 2169593 Y | 6/1994 | |
| CN | 2170254 Y | 6/1994 | |
| CN | 2183329 Y | 11/1994 | |
| CN | 2188541 Y | 2/1995 | |
| CN | 2206250 Y | 8/1995 | |
| CN | 2210849 Y | 10/1995 | |
| CN | 2277928 Y | 4/1998 | |
| CN | 2279303 Y | 4/1998 | |
| CN | 2409135 Y | 12/2000 | |
| CN | 2409136 Y | 12/2000 | |
| CN | 2428396 Y | 5/2001 | |
| CN | 2434218 Y | 6/2001 | |
| CN | 1330015 A | 1/2002 | |
| CN | 2470233 Y | 1/2002 | |
| CN | 2478916 Y | 2/2002 | |
| CN | 1342562 A * | 4/2002 | B60B 1/042 |
| CN | 2509074 Y | 9/2002 | |
| CN | 1439567 A | 9/2003 | |
| CN | 1453179 A | 11/2003 | |
| CN | 1463881 A | 12/2003 | |
| CN | 2683516 Y | 3/2005 | |
| CN | 1663872 A | 9/2005 | |
| CN | 2749776 Y | 1/2006 | |
| CN | 2782543 Y | 5/2006 | |
| CN | 2806294 Y | 8/2006 | |
| CN | 1864888 A | 11/2006 | |
| CN | 1907802 A | 2/2007 | |
| CN | 1927649 A | 3/2007 | |
| CN | 200995764 Y | 12/2007 | |
| CN | 100379506 C | 4/2008 | |
| CN | 201179942 Y | 1/2009 | |
| CN | 201712753 U | 1/2011 | |
| CN | 201863981 U | 6/2011 | |
| CN | 202670040 U | 1/2013 | |
| CN | 202827970 U | 3/2013 | |
| CN | 203078709 U | 7/2013 | |
| CN | 203111435 U | 8/2013 | |
| CN | 103448859 A | 12/2013 | |
| CN | 203410583 U | 1/2014 | |
| DE | 4002574 A1 | 1/1991 | |
| DE | 29600548 U1 | 4/1996 | |
| DE | 19601125 A1 | 7/1997 | |
| DE | 19751879 A1 * | 5/1999 | B62M 3/003 |
| DE | 19755950 A1 | 6/1999 | |
| DE | 10032778 A1 | 1/2002 | |
| DE | 102007028897 A1 * | 1/2009 | B62M 3/003 |
| DE | 102016210865 A1 * | 12/2017 | F16D 1/10 |
| EP | 0898542 B1 | 5/1997 | |
| EP | 0849153 B1 | 12/1997 | |
| EP | 0849154 A2 | 6/1998 | |
| EP | 0849155 A2 | 6/1998 | |
| EP | 1270393 B1 | 1/2003 | |
| EP | 1281609 B1 | 2/2003 | |
| EP | 1378430 A1 | 1/2004 | |
| EP | 1378433 A1 | 1/2004 | |
| EP | 1419961 A1 | 5/2004 | |
| EP | 1792821 A1 | 6/2007 | |
| EP | 1818251 A1 | 8/2007 | |
| EP | 1486413 B1 | 4/2010 | |
| EP | 1818252 B1 | 9/2011 | |
| EP | 1820726 B1 | 9/2011 | |
| EP | 2311718 B1 | 10/2011 | |
| EP | 2412620 A1 | 2/2012 | |
| EP | 1669285 B1 | 4/2012 | |
| EP | 2441656 A1 | 4/2012 | |
| EP | 1486412 B1 | 5/2014 | |
| EP | 3 109 062 A1 | 12/2015 | |
| FR | 2780698 | 1/2000 | |
| GB | 1031337 | 6/1966 | |
| GB | 1281731 | 7/1972 | |
| GB | 1361394 | 7/1974 | |
| GB | 1431308 | 4/1976 | |
| GB | 2225296 A | 5/1990 | |
| JP | 1995-002157 | 1/1995 | |
| JP | 3196695 | 6/2001 | |
| JP | 3248675 | 11/2001 | |
| JP | 2007-223586 | 9/2007 | |
| JP | 2009-12766 | 1/2009 | |
| JP | 2011-93526 | 5/2011 | |
| JP | 2012-171419 | 9/2012 | |
| JP | 2017035926 A | 2/2017 | |
| KR | 10-2011-0075299 | 7/2011 | |
| KR | 10-2012-0111687 | 10/2012 | |
| KR | 10-1346783 | 12/2013 | |
| NL | 1015666 | 1/2001 | |
| NL | 2005745 | 5/2012 | |
| NZ | 598054 | 5/2013 | |
| SK | 1032-95 | 2/1996 | |
| SK | 280106 | 6/1999 | |
| TW | 448114 | 6/1989 | |
| TW | 461866 | 6/1989 | |
| TW | 500679 | 1/1990 | |
| TW | 498039 | 7/1990 | |
| TW | 499380 | 10/1990 | |

(56) References Cited

FOREIGN PATENT DOCUMENTS

| | | |
|---|---|---|
| TW | 548158 | 10/1990 |
| TW | 527254 | 5/1991 |
| TW | 200800717 | 6/1995 |
| TW | I288100 | 6/1995 |
| TW | M324029 | 3/1996 |
| TW | 200846243 | 5/1996 |
| TW | I363725 | 5/1996 |
| TW | 284731 | 9/1996 |
| TW | 200922834 | 11/1996 |
| TW | M337531 | 11/1996 |
| TW | 200932621 | 8/1998 |
| TW | M264208 | 5/2005 |
| TW | I275525 | 12/2005 |
| TW | 201026555 A1 | 7/2010 |
| TW | 201029769 A1 | 8/2010 |
| TW | M386236 | 8/2010 |
| TW | I351327 B1 | 11/2011 |
| TW | 201204597 A1 | 2/2012 |
| TW | M458370 U1 | 8/2013 |
| TW | I411554 B | 10/2013 |
| TW | I411555 B | 10/2013 |
| TW | 201422482 A | 6/2014 |
| WO | 89/08039 | 8/1989 |
| WO | 96/03306 | 2/1996 |
| WO | 99/54193 | 10/1999 |
| WO | 01/72578 A1 | 10/2001 |
| WO | 02/32751 A2 | 4/2002 |
| WO | 03/000543 A1 | 1/2003 |
| WO | 2004/080786 A2 | 9/2004 |
| WO | 2004/094218 A2 | 11/2004 |
| WO | 2012/065256 A1 | 5/2012 |
| WO | 2012/069389 A1 | 5/2012 |

OTHER PUBLICATIONS

Mountain Cycle Catalog 2000, www.MountainCycle.com.
Mountain Bike Action Magazine, Oct. 2000, pp. 38-40, www.mbaction.com.
Mountain Cycle Shockwave—Photos.
Mountain Bike Action Magazine 2000, p. 138, www.mbaction.com.
Mountain Cycle Universal Chainguide Instructions, www.mountaincycle.com.
2001 Gizmo Installation Instructions, web.archive.org/web/20011025172447/http://mrdirt.com/gizmo/page4.htm.
Mr.Dirt Gizmo Pictures.
2006 Race Face Interbike(Trade Show)Booth, www.bikemagic.com.
Raceface Diabolous Chainguide Instructions.
Decline Magazine, Issue 20, Article "Its the New Style", Jan. Feb. 2006.
Diabolus Chainguide actual Product Photos.
International Search Report from PCT/US2017/023016.
International Search Report and Written Opinion from International Application No. PCT/US18/46952 dated Nov. 9, 2018.
International Preliminary Report on Patentability from PCT Application No. PCT/US2017/023016.
The European Search Report dated Apr. 1, 2019 for European Application No. 16842566.8.
The European Search Report for European Application No. 17 77 0865 dated Jun. 13, 2019.
The International Preliminary Report for the PCT Application No. PCT/US2018/046952 dated Mar. 5, 2020.
The Taiwan Office Action for Taiwanese Patent Application No. 105126339 dated Jan. 9, 2020.
The European Office Action dated Mar. 5, 2020 for the European Patent Application No. 16 842 566.8.
The Chinese Office Action for the Chinese Patent Application No. 201780017990.01 dated Feb. 3, 2020.
The Taiwanese Office Action dated Jun. 29, 2020 for the Taiwan Patent Application No. 105126399.
The Taiwanese Examination Notification dated Jul. 31, 2020 for the Taiwan Patent Application No. 106109159.
The Chinese Office Action dated Apr. 29, 2020 for the Chinese Patent Application No. 2016800500067.
The Second Office Action dated Sep. 14, 2020 for the Taiwan Patent Application No. 201780017990.1.
The Chinese Notice of Examination dated Mar. 1, 2021 from the Chinese Patent Application No. 201880064395.8.
The Official Letter dated Dec. 1, 2020 from the European Patent Application No. 16842533.8.
The Notice to Grant dated Feb. 19, 2021 from the Chinese Patent Application No. 201680050006.7.

* cited by examiner

Fig. 16
Fig. 17
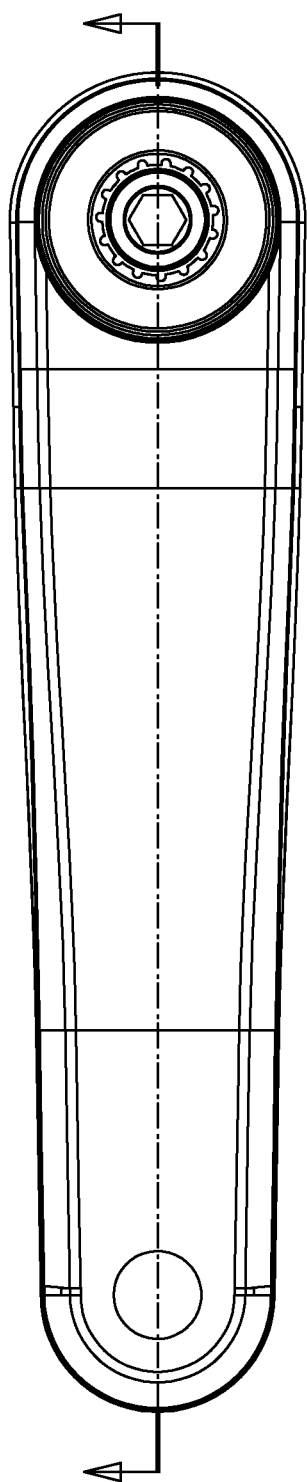
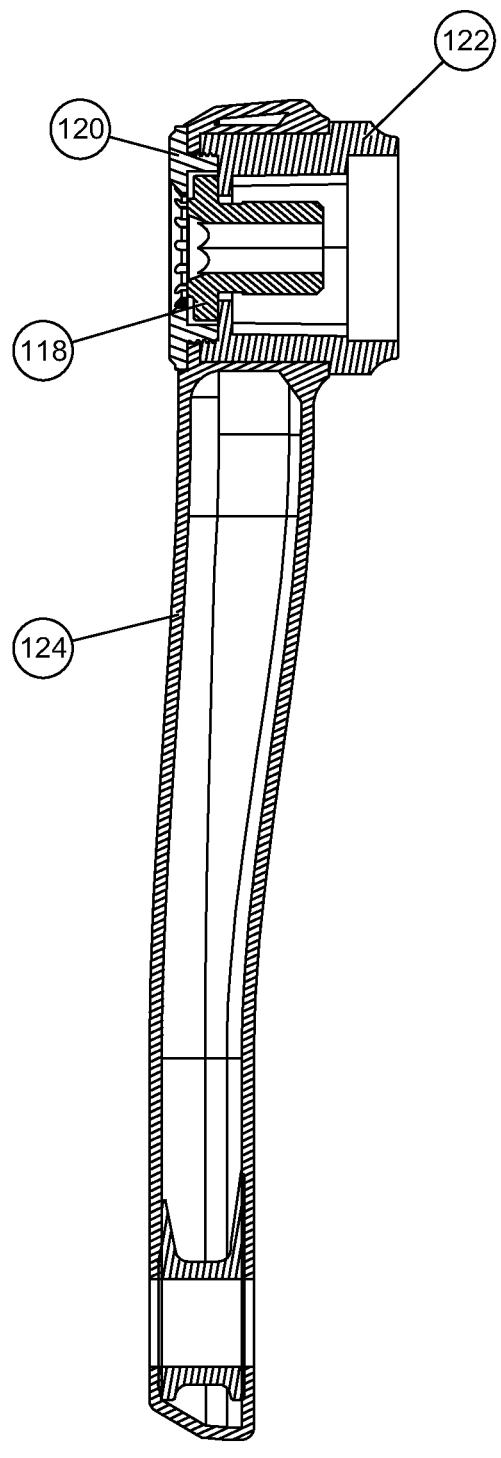

BICYCLE CRANK WITH SPINDLE ATTACHMENT STRUCTURE

RELATED APPLICATIONS

This Patent Application claims priority under 35 U.S.C. 119(e) of the U.S. provisional patent application, Application No. 62/313,024, filed on Mar. 24, 2016, and entitled "BICYCLE CRANK WITH SPINDLE ATTACHMENT STRUCTURE," which is also hereby incorporated by reference in its entirety.

FIELD OF THE INVENTION

The present invention is generally directed to bicycle cranks and crank arms. More specifically, the present invention is directed to a composite bicycle crank with an integral spindle attachment structure.

BACKGROUND OF THE INVENTION

For an efficient transfer of power to a bicycle it is important that the crank set and crank arms are manufactured from strong materials while at the same time minimizing the weight of the crank set and the crank arms. Typically, a left side crank arm and a right side crank arm are shaped differently and must be manufactured in separate processes or using different molds. This adds time and cost to the manufacturing process and also requires that the left side crank arm and the right side crank arm are attached using different methods.

SUMMARY OF THE INVENTION

A composite bicycle crank with an integral spindle attachment structure provides a unique method for attaching a bicycle crank arm to a bicycle crank spindle, and also for attaching a bicycle crank arm to a crank arm insert. A light-weight crank arm is able to be manufactured separately from the crank spindle or insert, and then securely attached after both pieces have been made. This allows for the pieces of the crank assembly to be manufactured from one or more different materials, and securely connected after manufacturing, to create a lower weight assembly than would be possible otherwise.

In one aspect, a bicycle crank set comprises a crank spindle, a left side crank arm configured to couple to the crank spindle through an integral spindle attachment structure and a right side crank arm configured to couple to the crank spindle through the integral spindle attachment structure. In some embodiments, the integral spindle attachment structure of the left side crank arm and the right side crank arm comprises a round lobed spline interface. In further embodiments, the integral spindle attachment structure of the left side crank arm and the right side crank arm comprises one of a circular interface, a square interface, a triangular interface, a square toothed spline, an involute spline, a tri-lobe polygon shape, a four-lobe polygon shape, and a geometric shape. In some embodiments, the left side crank arm couples to the crank spindle through a spindle insert. In some embodiments, the right side crank arm couples to the crank spindle through a spindle insert. In further embodiments, the left side crank arm couples to the crank spindle through one of a splined interface, a tapered square interface, and a torque transmitting coupling. In some embodiments, the left side crank arm is manufactured from a first material and the insert is manufactured from a second material different than the first material. In some embodiments, the right side crank arm couples to the crank spindle through one of a splined interface, a tapered square interface, and a torque transmitting coupling. In further embodiments, right side crank arm is manufactured from a first material and the insert is manufactured from a second material different than the first material. In some embodiments, the integral spindle attachment structure of the left side crank arm and the right side crank arm comprises a tapered interface. In some embodiments, the left side crank arm and the right side crank arm comprise a hollow structure. In some embodiments, the bicycle crank set comprises one or more chain rings. In some embodiments, thee bicycle crank set comprises one or more spacers for adjusting a chainline of the one or more chain rings.

In another aspect, a bicycle crank arm comprises an integral spindle attachment structure comprising a round lobed spline interface for coupling with a crank spindle of a bicycle. In some embodiments, the crank arm comprises a right side crank arm. In some embodiments, the crank arm comprise a left side crank arm. In some embodiments, the crank arm couples to the crank spindle through a spindle insert. In further embodiments, the crank arm is manufactured from a first material and the insert is manufactured from a second material different than the first material. In some embodiments, the crank arm comprise a hollow structure.

In a further aspect, a method of installing a crank arm on a crank spindle comprises cleaning one or more bonding surfaces of an insert and a crank arm, applying an adhesive to the one or more bonding surfaces of the insert and the crank arm, sliding on the insert into a receiving shape of the crank arm, installing a fastener through a hole in the crank arm, applying torque to the fastener, and curing the adhesive. In some embodiments, the crank arm comprises a left side crank arm. In some embodiments, the crank arm comprises a right side crank arm. In further embodiments, the crank arm is manufactured from a first material and the insert is manufactured from a second material different than the first material. In some embodiments, the crank arm comprise a hollow structure.

In still a further aspect, method of installing a crank arm on a crank spindle comprises cleaning one or more bonding surfaces of a crank arm, applying an adhesive to the one or more bonding surfaces of the crank arm, installing a fastener through a hole in the crank arm, applying torque to the fastener, and curing the adhesive. In some embodiments, the crank arm comprises a left side crank arm. In some embodiments, crank arm comprises a right side crank arm. In some embodiments, the crank arm comprise a hollow structure.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures:

FIG. 16 illustrates a left side view of a left crank arm assembly in accordance with some embodiments.

FIG. 17 illustrates a top section view of a left crank arm assembly in accordance with some embodiments.

DETAILED DESCRIPTION OF THE EMBODIMENTS

Embodiments of the invention are directed to a composite bicycle crank with an integral spindle attachment structure provides a unique method for attaching a bicycle crank arm to a bicycle crank spindle, and also for attaching a bicycle crank arm to a crank arm insert. A light-weight crank arm is able to be manufactured separately from the crank spindle or insert, and then securely attached after both pieces have been made. This allows for the pieces of the crank assembly to be manufactured from one or more different materials, and securely connected after manufacturing, to create a lower weight assembly than would be possible otherwise.

Reference will now be made in detail to implementations of a bicycle crank with spindle attachment structure. The same reference indicators will be used throughout the drawings and the following detailed description to refer to the same or like parts. In the interest of clarity, not all of the routine features of the implementations described herein are shown and described. It will be appreciated that in the development of any such actual implementation, numerous implementation-specific decisions can be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
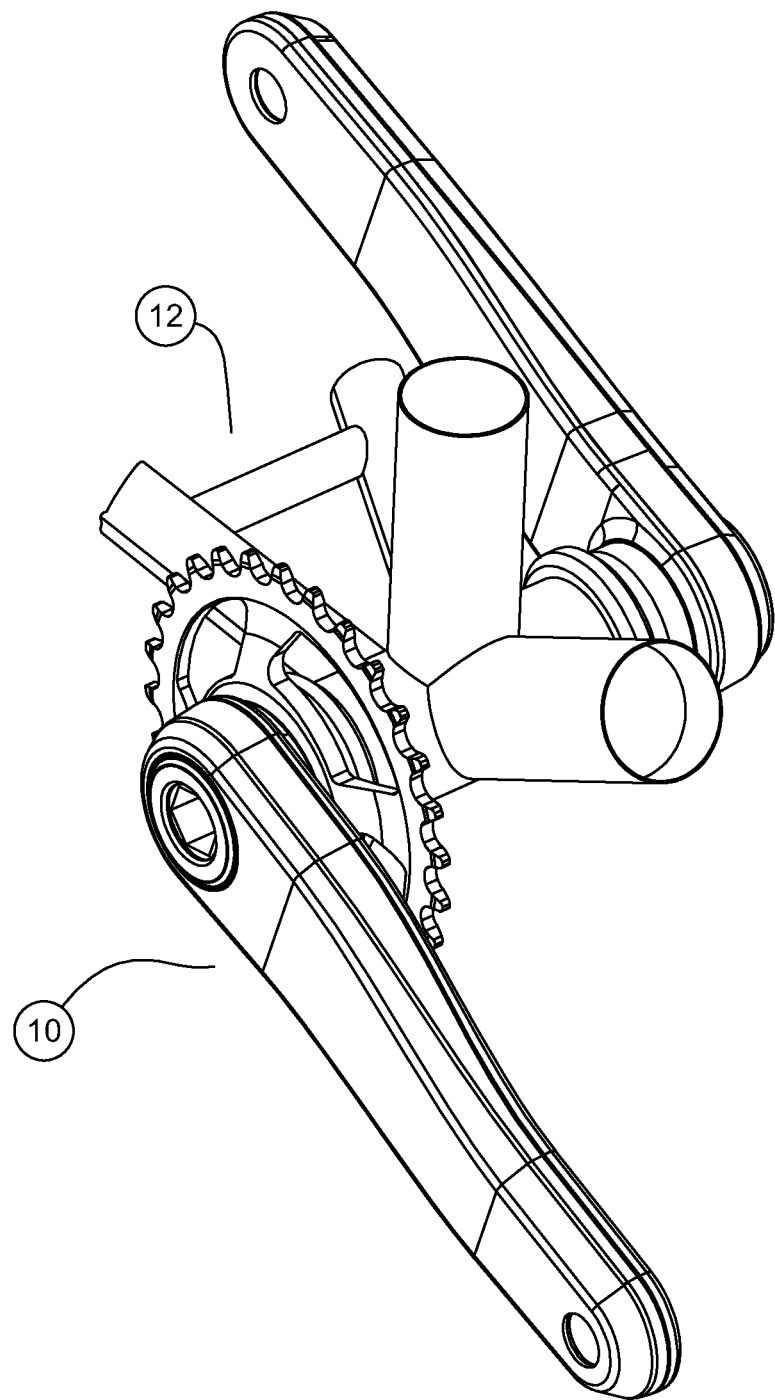
FIG. 1 illustrates an isometric top front right view of a crank set assembled to a bicycle frame in accordance with some embodiments.

Referring now to FIG. 1, a bicycle crank set and bottom bracket assembly 10 is installed in a bicycle frame bottom bracket assembly 12. The bicycle crank set and bottom bracket assembly 10 are shown cut away from a complete bicycle frame.

Figure 2:
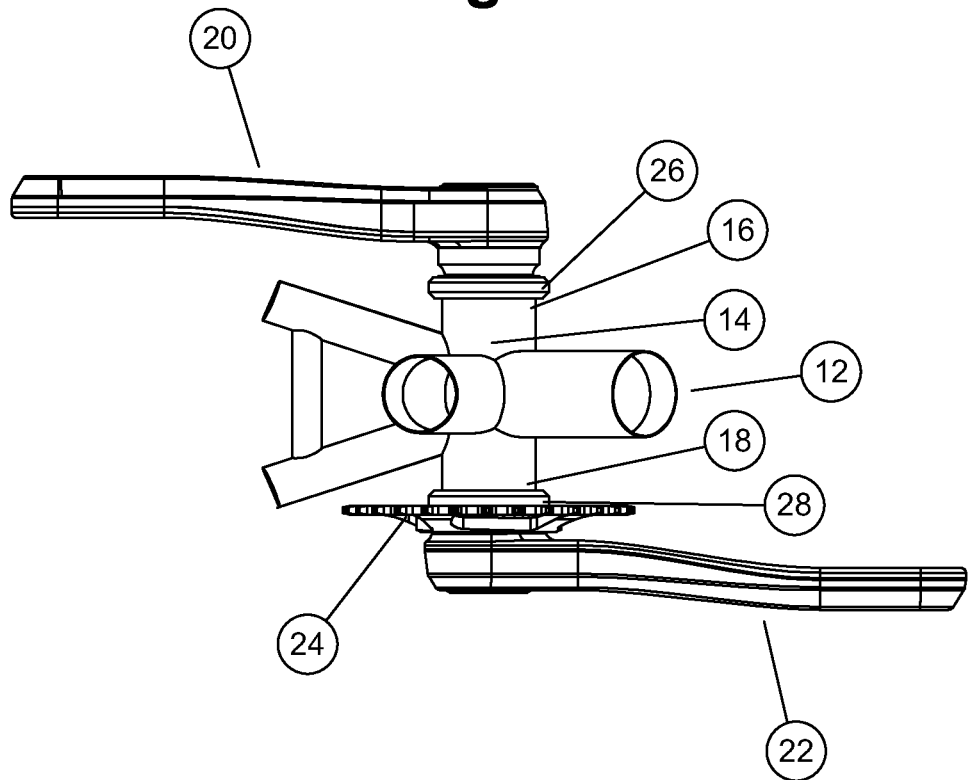
FIG. 2 illustrates a top view of a crank set assembled to a bicycle frame in accordance with some embodiments.
Figure 3:
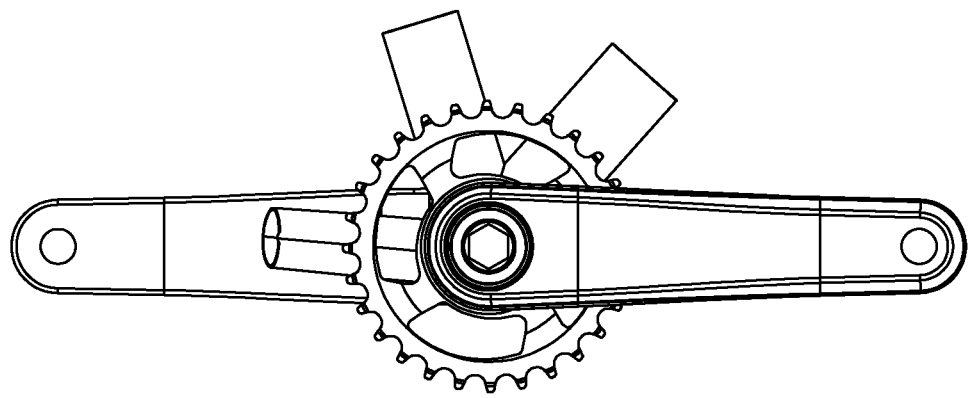
FIG. 3 illustrates a right side view of a crank set assembled to a bicycle frame in accordance with some embodiments.

As shown within FIG. 2 and FIG. 3, the bicycle frame bottom bracket assembly 12 comprising a bottom bracket shell 14 that comprises a left end 16 and a right end 18. The crank set and bottom bracket assembly 10 comprises a left crank arm assembly 20, a right crank arm assembly 22, and one or more chain rings 24. The crank set and bottom bracket assembly 10 also comprises a left bottom bracket cup assembly 26 and a right bottom bracket cup assembly 28.

Figure 4:
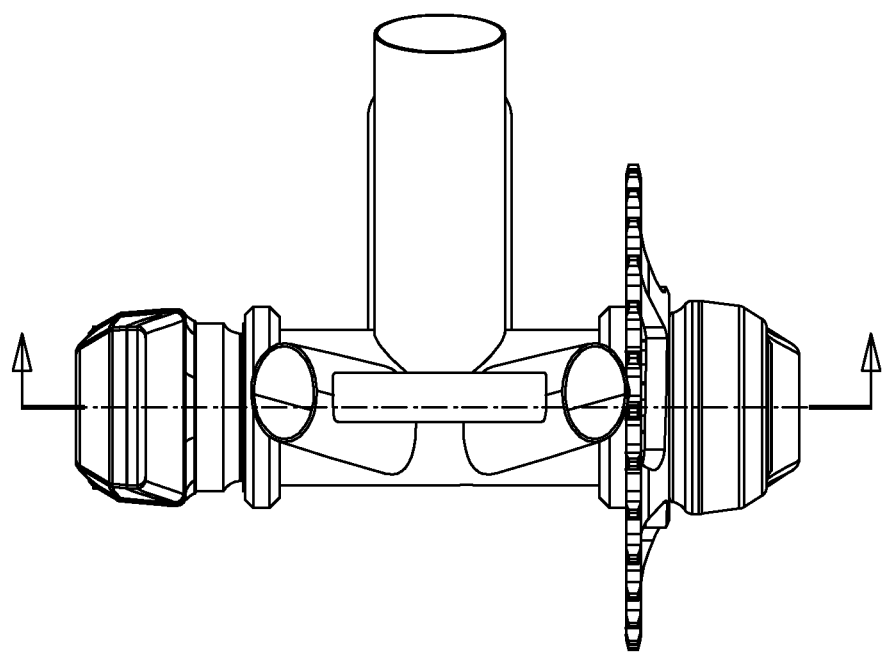
FIG. 4 illustrates a rear view of a crank set assembled to a bicycle frame in accordance with some embodiments.
Figure 5:
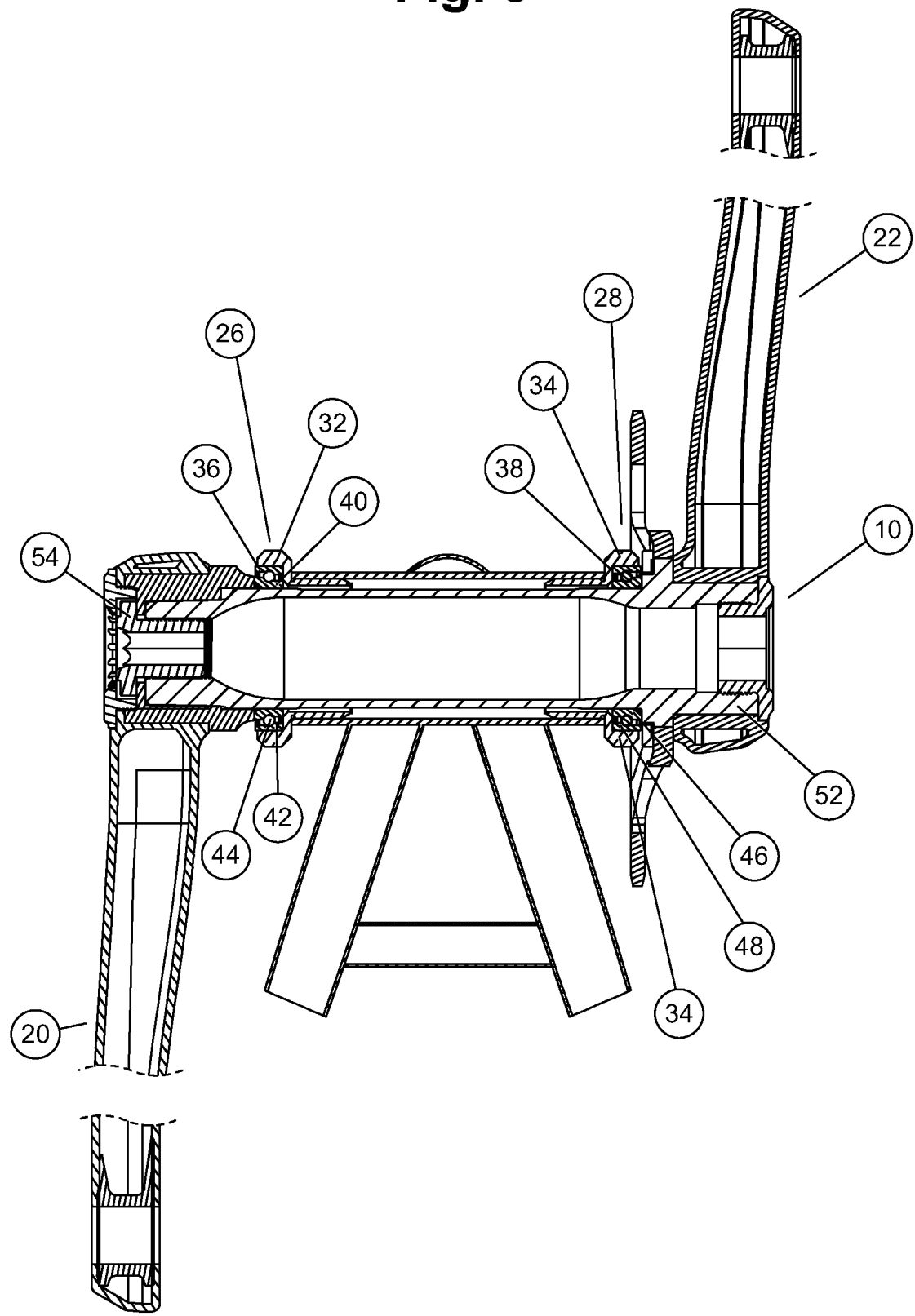
FIG. 5 illustrates a top section view derived from FIG. 4 of a crank set with a bottom bracket installed on a bicycle in accordance with some embodiments.
Figure 6:
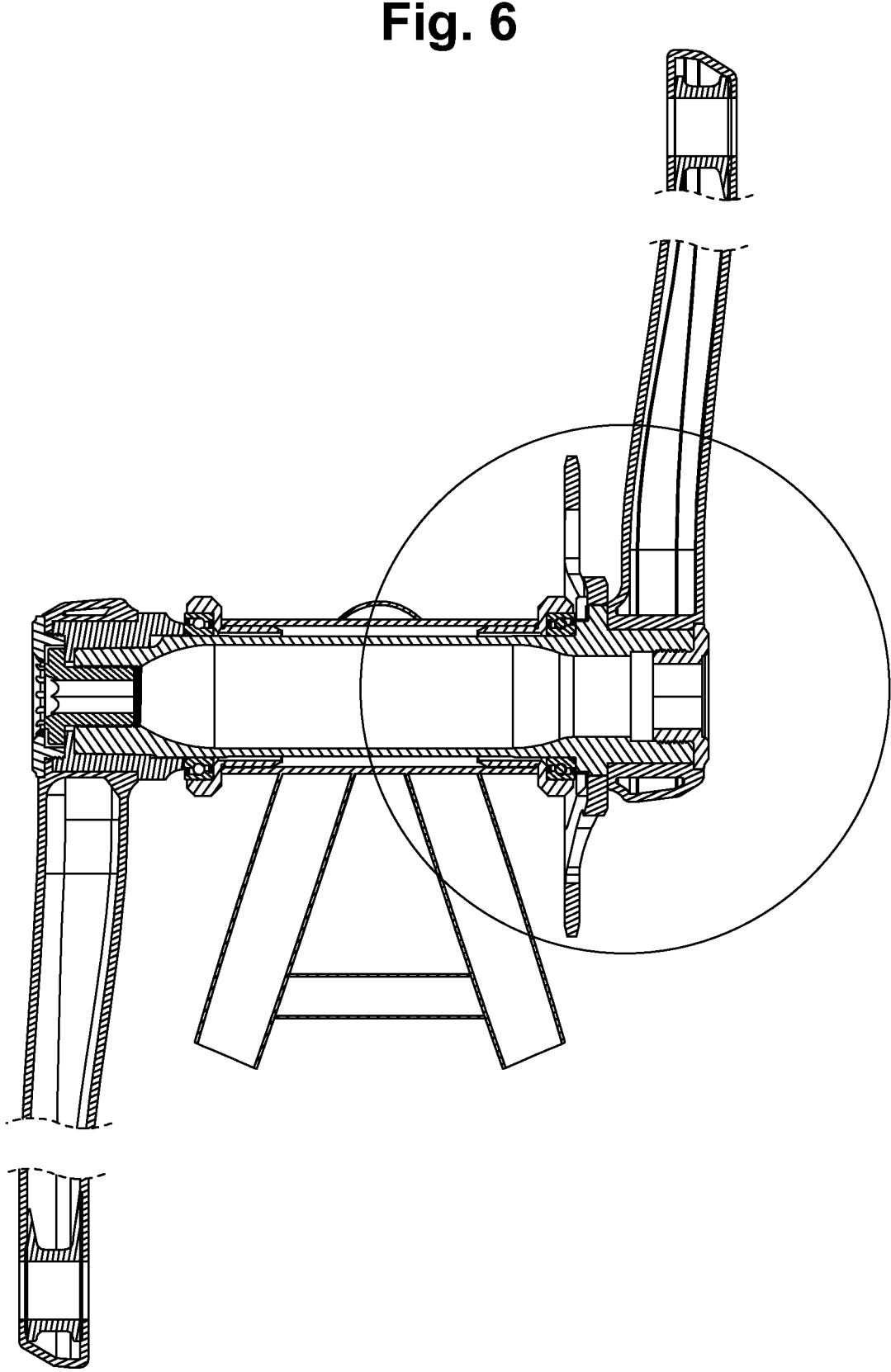
FIG. 6 illustrates a top section view derived from FIG. 4 of a crank set with a bottom bracket installed on a bicycle in accordance with some embodiments.

As shown within FIG. 4 and FIG. 5, the left bottom bracket cup assembly 26 and the right bottom bracket cup assembly 28 comprise a left bottom bracket cup 32 and a right bottom bracket cup 34, a left bottom bracket ball bearing 36 and a right bottom bracket ball bearing 38.

The left bottom bracket ball bearing 36 includes a left inner race 40, a left outer race 42 and a left bearing plurality of balls 44 between the races. The right bottom bracket ball bearing 38 includes a right inner race 46, a right outer race 48 and a right bearing plurality of balls 50 between the races. The bicycle crank set and bottom bracket assembly 10 comprises a crank spindle 52 which is attached to right arm assembly 22, and a left crank fastening bolt 54 which removably couples the left crank arm assembly 20 to the spindle 52.

Figure 7:
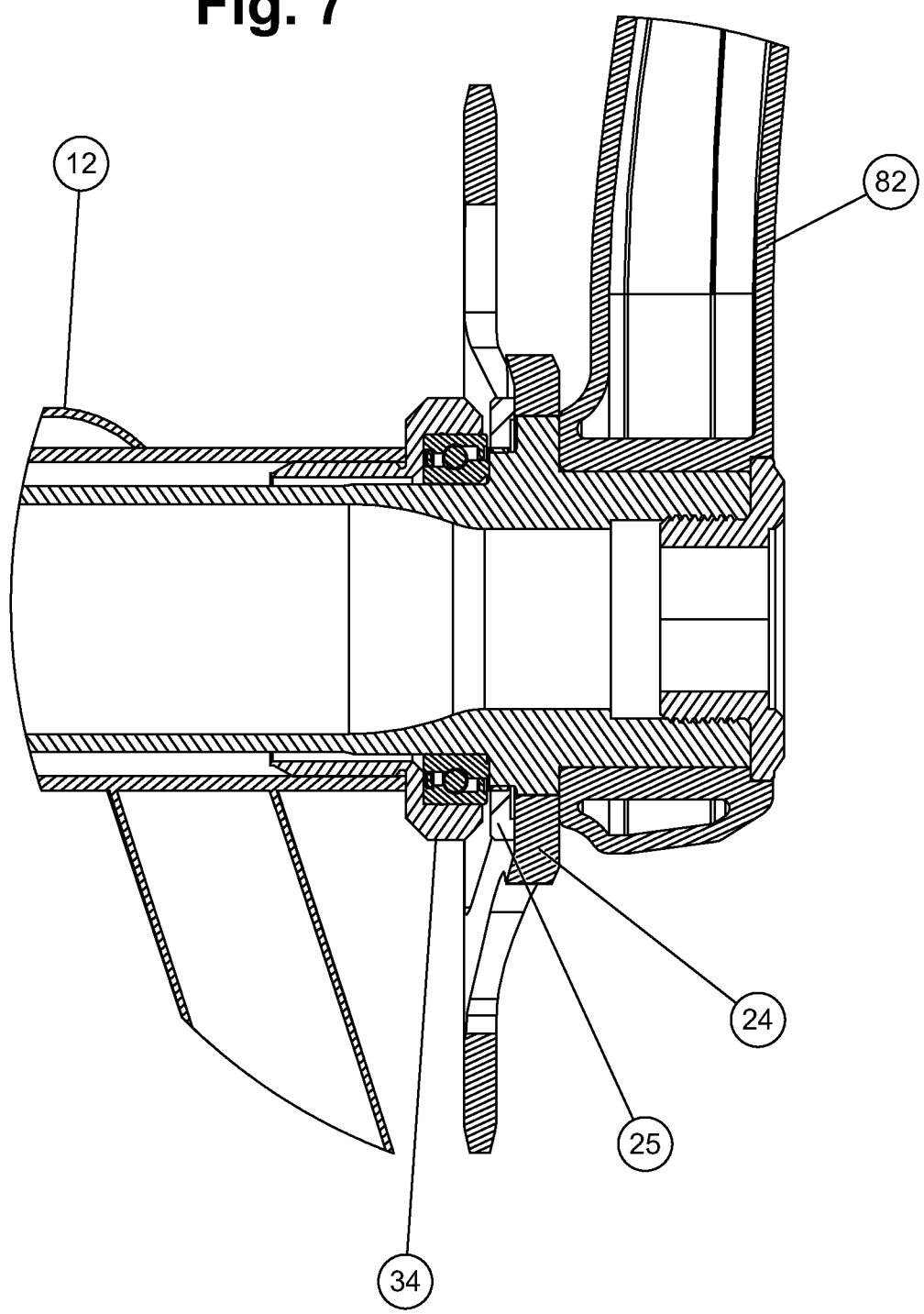
FIG. 7 illustrates a detail section view from FIG. 6 of a crank set with a bottom bracket installed on a bicycle in accordance with some embodiments.

As shown in a detail cross section view of FIG. 7, the chain ring 24 is sandwiched between a right molded crank arm 82 and the chainring lock ring 25.

Figure 8:
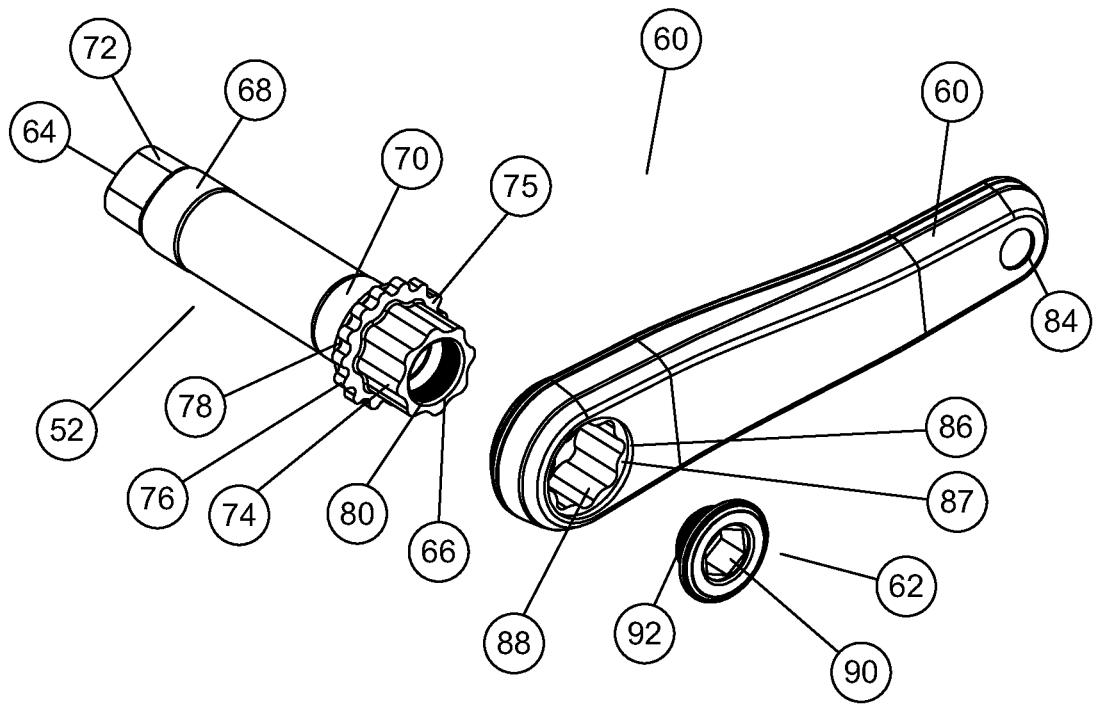
FIG. 8 illustrates an isometric top rear right exploded view of a right crank arm assembly in accordance with some embodiments.
Figure 9:
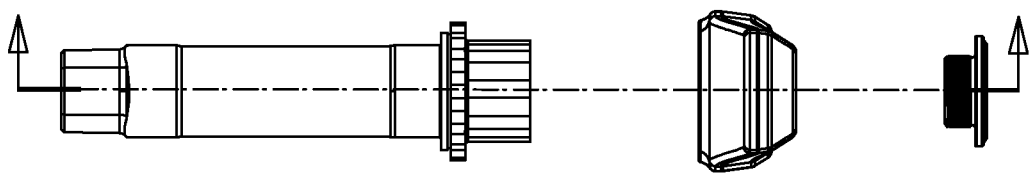
FIG. 9 illustrates a front exploded view of a right crank arm assembly in accordance with some embodiments.

As shown in the exploded view of FIG. 8, a right crank arm assembly 22 comprises a crank spindle 52, a right crank arm 60, and a right crank arm attachment screw 62. The crank spindle 52 includes a left spindle end 64, a right spindle end 66, a left bearing race surface 68, a right bearing race surface 70, a left crank arm spindle torque coupling feature 72, a right crank arm spindle torque coupling feature 74, a torque coupling feature stop face 75, a chainring attachment spline 76, a lockring attachment thread 78, and a right arm bolt threaded hole 80. In some embodiments, the right arm spindle torque coupling feature 74 comprises a round lobed spline interface.

The right crank arm assembly 60 comprises a right molded crank arm 82. The molded crank arm 82 comprises a right pedal hole 84, a right arm spindle fastener counterbore 86, a right arm spindle fastener counterbore pressure face 87, and a right crank arm torque coupling feature 88. In some embodiments such as shown with FIG. 8, the coupling feature comprise a spline.

The right crank arm attachment screw 62 comprises a right crank arm attachment screw driving feature 90, and a right crank arm attachment screw male thread 92.

Figure 10:
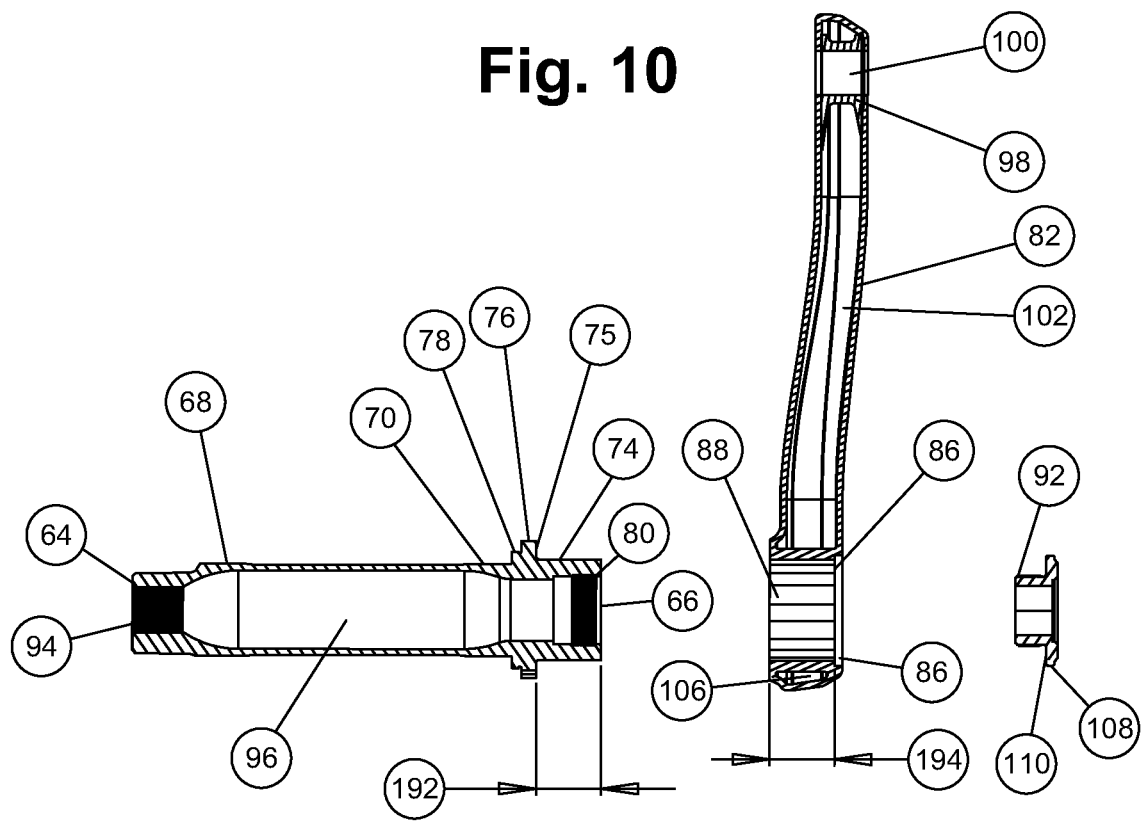
FIG. 10 illustrates a top exploded section view of a right crank arm assembly in accordance with some embodiments.
Figure 11:
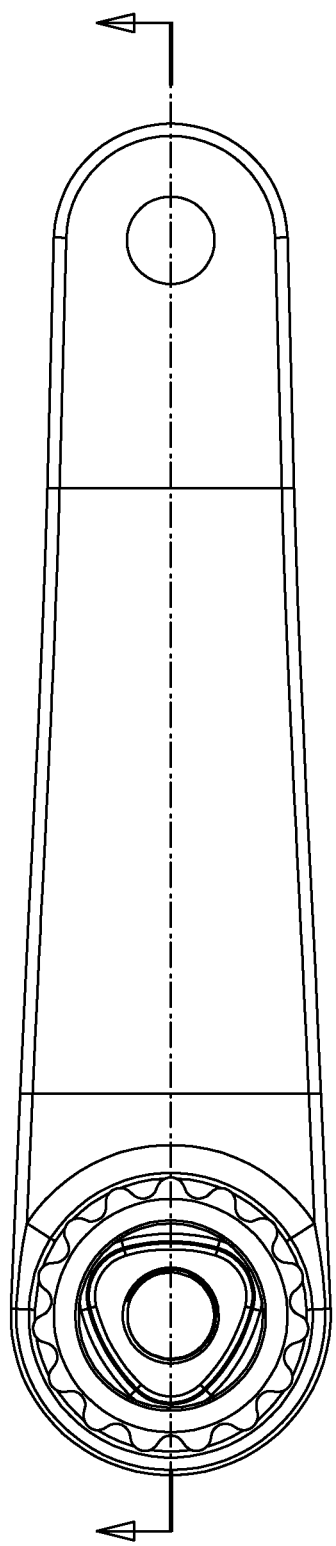
FIG. 11 illustrates a left side view of a right crank arm assembly in accordance with some embodiments.

FIG. 10 shows an exploded section view of the right crank arm assembly 60. In addition to the features represented in FIG. 8, FIG. 10 also shows a left crank fastening bolt threaded hole 94, and a crank spindle hollow bore 96.

FIG. 10 also shows a cross section view of a right molded crank arm 82. The right molded crank arm 82 includes a right in-molded pedal insert 98, which comprises a right pedal insert threaded hole 100. The right molded crank arm 82 also comprises a right crank arm molded void 102, and a right crank arm spindle end void 106.

As further shown within FIG. 10, the right crank arm attachment screw 92 comprises of a right crank arm attachment screw flange 108, a right crank arm attachment screw flange pressure face 110, and the right crank arm attachment screw male thread 92. FIG. 10 also shows a spindle insert insertion distance 192, and a right arm spindle pocket distance 194.

Figure 12:
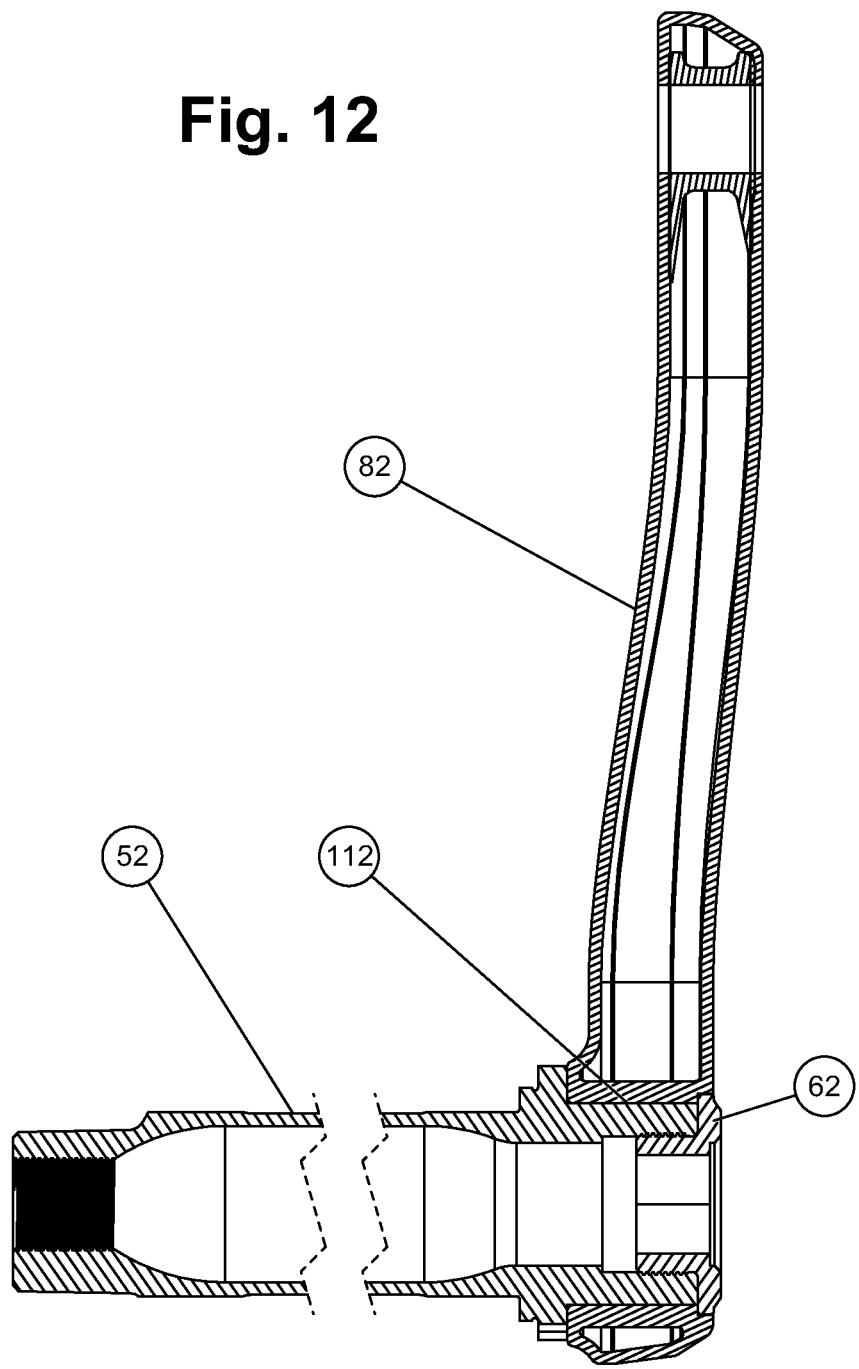
FIG. 12 illustrates a top section view derived from FIG. 11 of a right crank arm assembly in accordance with some embodiments.

FIG. 12 shows a cross section of the right crank arm assembly 60 with the crank spindle 52 and right crank arm attachment screw 62 in their assembled positions relative to the right molded crank arm 82. As shown within FIG. 12, the right crank arm spindle bond surface 112 in its assembled and bonded position.

Figure 13:
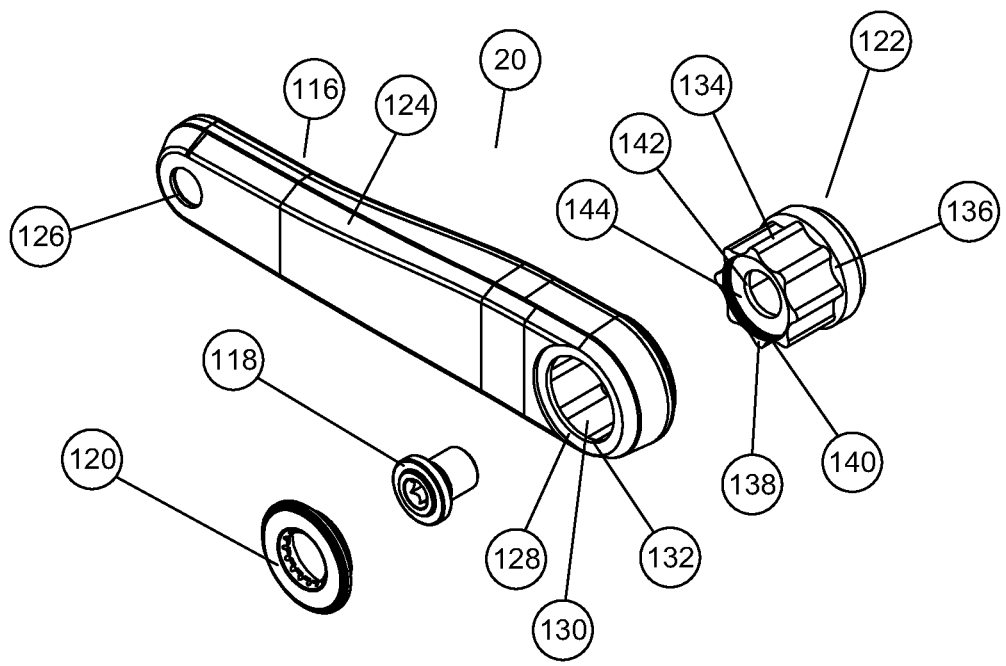
FIG. 13 illustrates an isometric top rear left exploded view of a left crank arm assembly in accordance with some embodiments.
Figure 14:
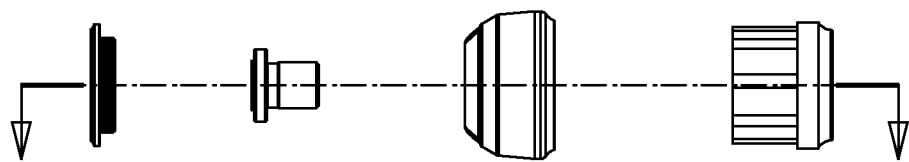
FIG. 14 illustrates a front exploded view of a left crank arm assembly in accordance with some embodiments.

As shown in the exploded view of FIG. 13, the left crank arm assembly 20 comprises a left crank arm 116, a left crank arm attachment screw 118, a left crank arm insert attachment screw 120 and a left crank arm spindle attachment insert 122. The left crank arm 116 comprises a left molded crank arm 124, a left pedal hole 126, a left arm spindle fastener counterbore 128, and a left crank arm torque coupling feature 130, in this case a spline is shown, and a left crank arm insert through hole 132. The left crank arm spindle attachment insert 122 is comprised of a left arm insert torque coupling feature 134, a left arm spindle attachment insert stop face 136, a left arm spindle attachment insert end face 138, a left arm spindle attachment insert internal thread 140, a left arm spindle attachment insert through hole 142, and a left arm spindle attachment insert screw press face 144. In some embodiments, the left arm insert torque coupling feature 134 comprises a round lobed spline interface.

Figure 15:
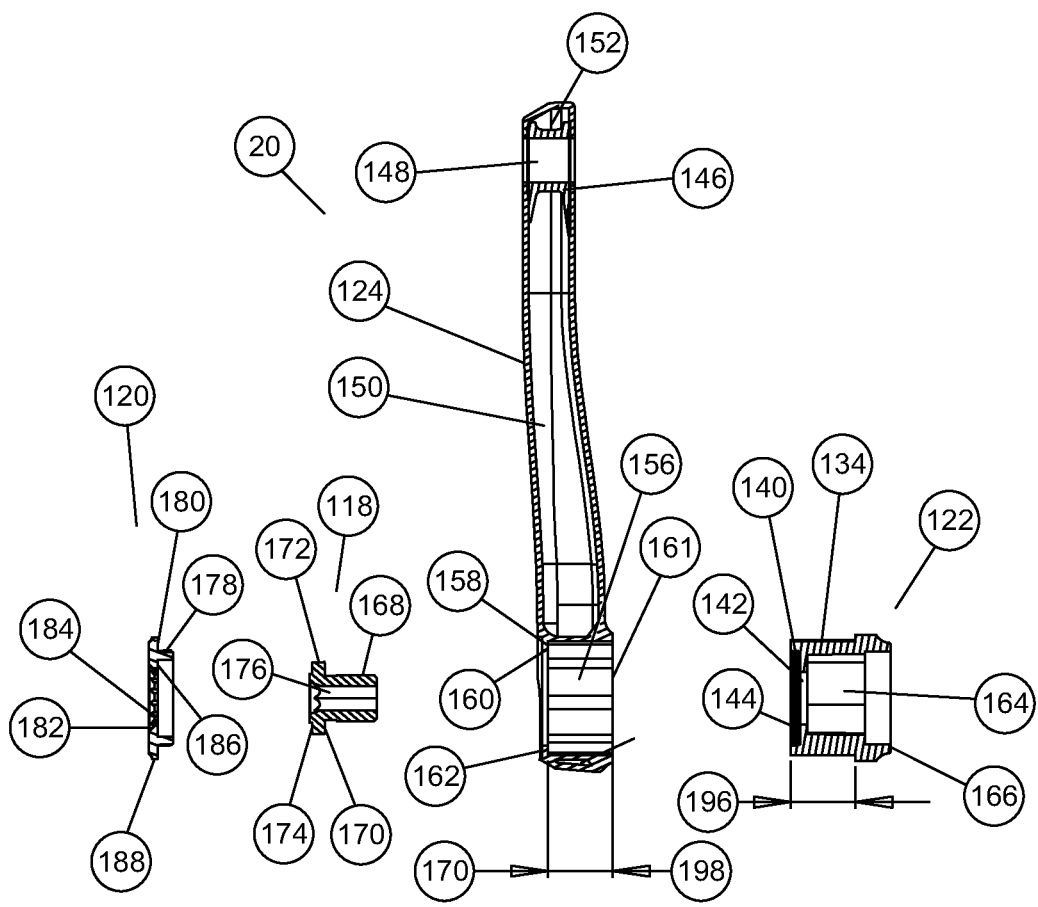
FIG. 15 illustrates a top exploded section view of a left crank arm assembly in accordance with some embodiments.
Figure 18:
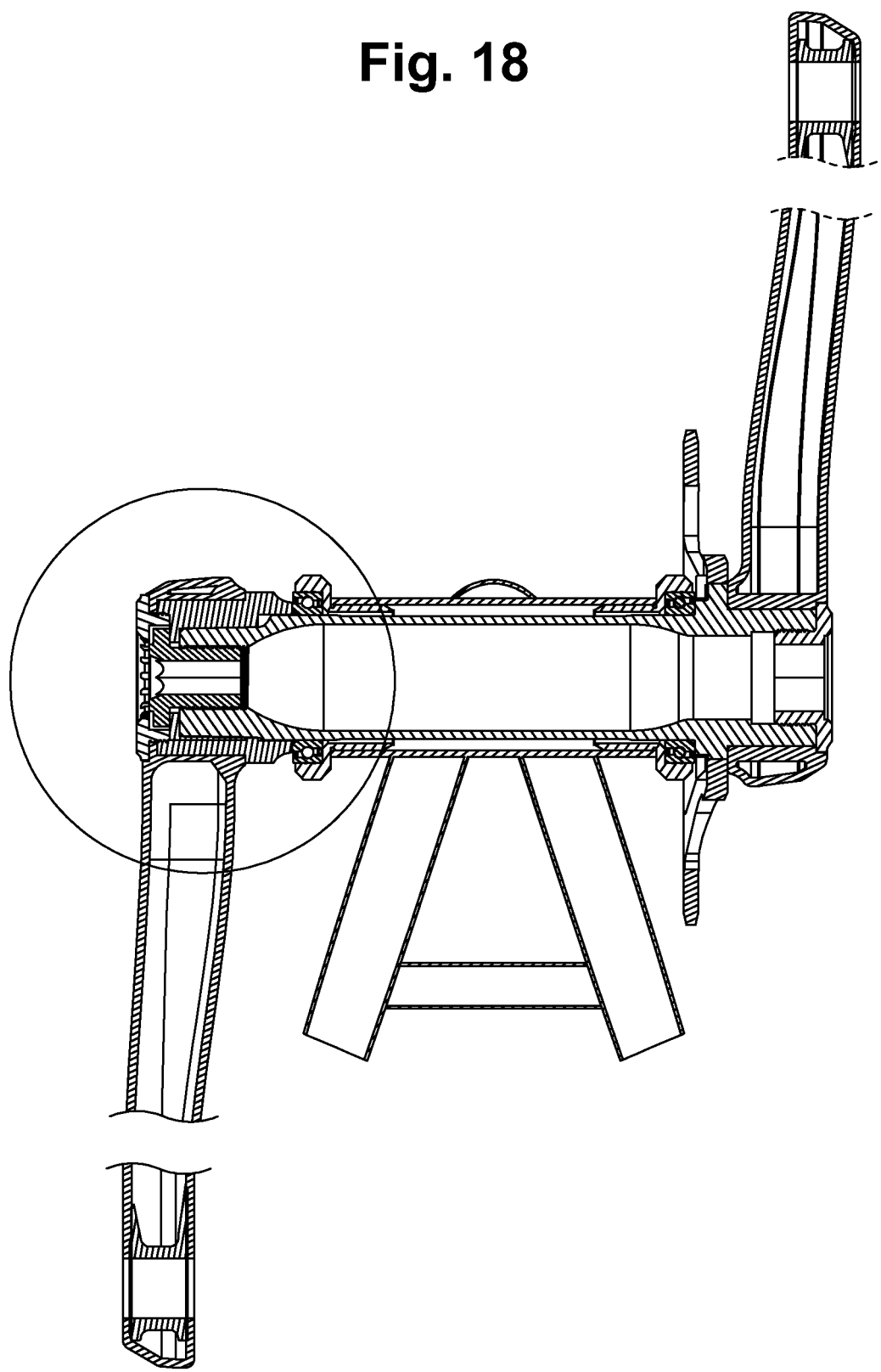
FIG. 18 illustrates a top section view derived from FIG. 4 showing detail for FIG. 19 of a crank set with a bottom bracket installed on a bicycle in accordance with some embodiments.

Exploded section view of FIG. 15 shows an alternate view of the left crank arm assembly 20, including a left molded crank arm 124 which is comprised of a left in-molded pedal insert 146, which includes a left pedal insert threaded hole 148. The left molded crank arm 124 also comprises a left crank arm molded void 150, a left crank arm pedal end void 152, a left crank arm spindle end void 154, a left crank arm torque coupling feature 156. The left molded crank arm 124 also includes a left arm torque coupling feature end face 158, a left coupling feature through hole 160, and a left arm outside counterbore pressure face 162.

FIG. 15 also shows a cross section of a left arm spindle attachment insert 122, also comprising a left arm spindle insert torque coupling feature 164, and a left arm spindle insert bearing stop face 166.

As further shown within FIG. 15, a left crank arm attachment screw 118 comprises a left arm attachment screw thread 168, a left arm attachment screw pressure face 170, a left arm attachment screw flange 172, a left arm attachment screw extraction face 174, and a left arm attachment screw torque driving feature 176.

FIG. 15 also shows a cross section of a left crank arm insert attachment screw 120, which comprises a left insert attachment screw thread 178, a left insert attachment screw compression face 180, a left insert attachment screw internal driving feature 182, a left insert attachment screw through hole 184, and a left insert attachment screw extraction pressure face 186, and a left insert attachment screw flange 188. FIG. 15 further shows a left arm insert stop face 161, a left arm insert insertion distance 196, and a left arm spindle pocket distance 198.

FIG. 17 shows an alternate cross section view of a left crank arm assembly 20 in its assembled configuration.

Figure 19:
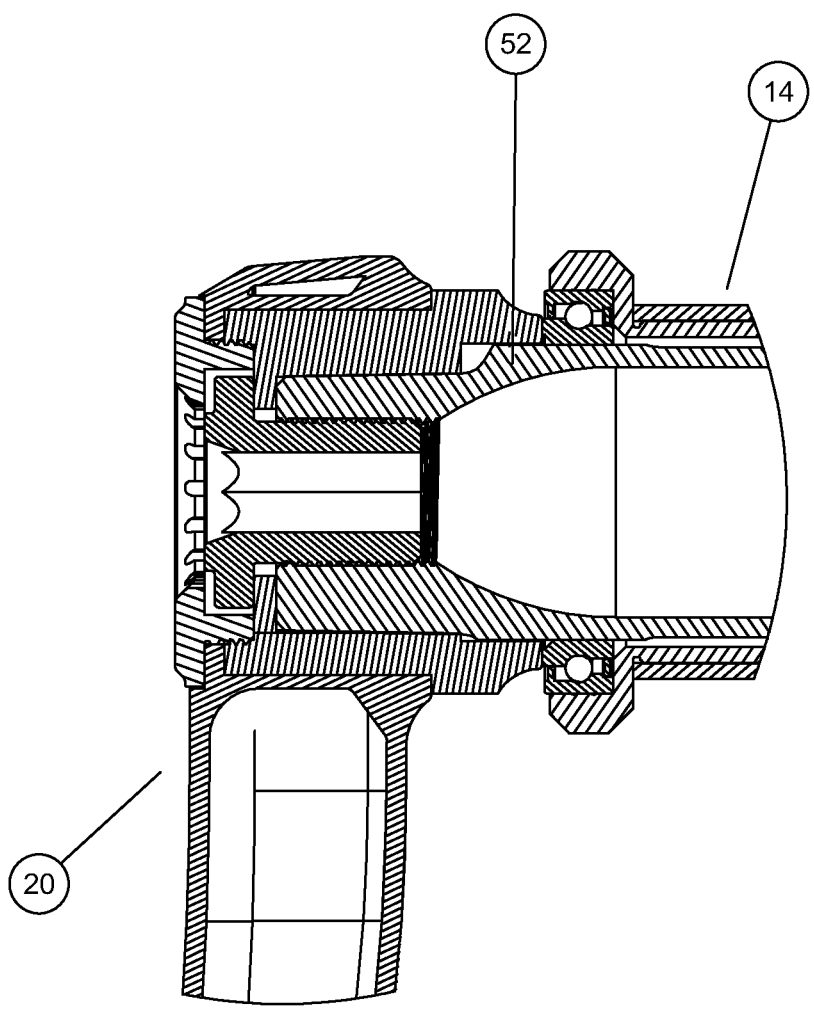
FIG. 19 illustrates a left arm section hub detail view derived from FIG. 18 of a crank set with bottom bracket installed on a bicycle in accordance with some embodiments.

FIG. 19 shows a cross section detail view of a left crank arm assembly 20 attached to a crank spindle 52 in its operable configuration mounted to a bicycle bottom bracket assembly 14.

Figure 20:
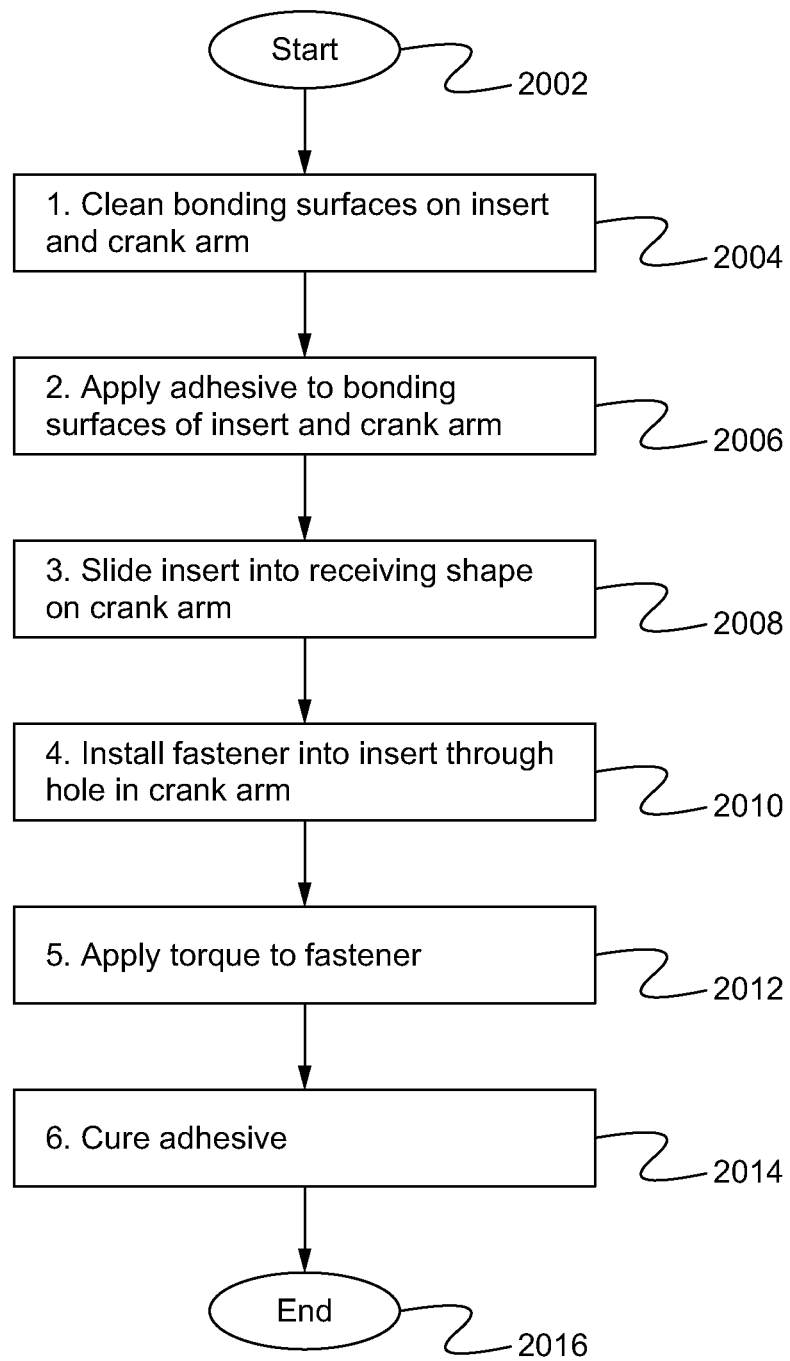
FIG. 20 illustrates a method of installing a crank arm on a crank spindle in accordance with some embodiments.
Figure 21A:
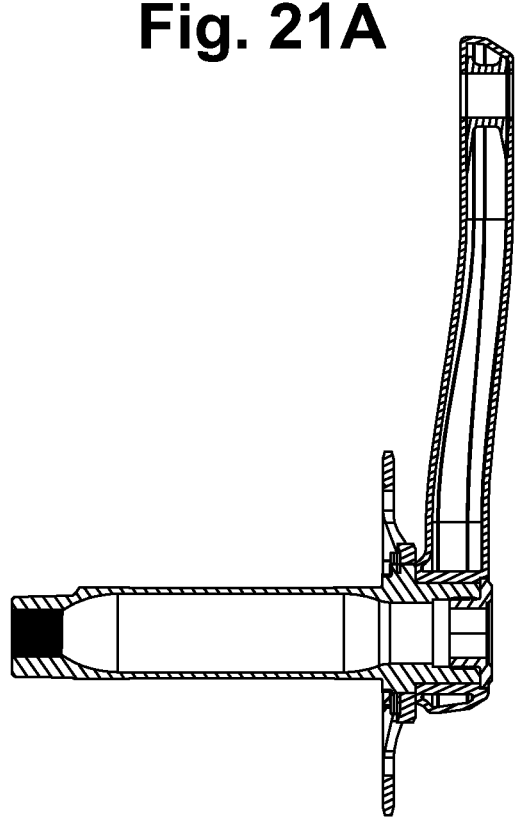
FIG. 21A illustrates a top section view of a right crank arm assembly in accordance with some embodiments.
Figure 21B:
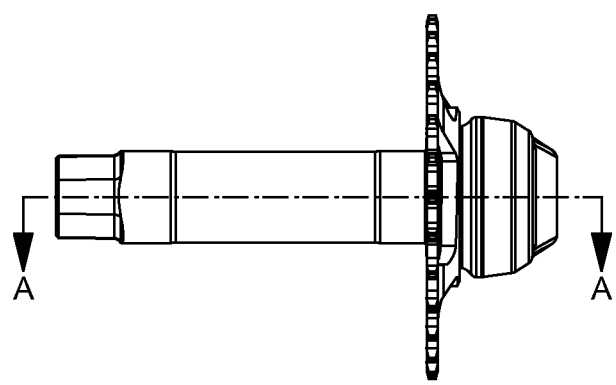
FIG. 21B illustrates a front view of a right crank arm assembly in accordance with some embodiments.
Figure 22A:
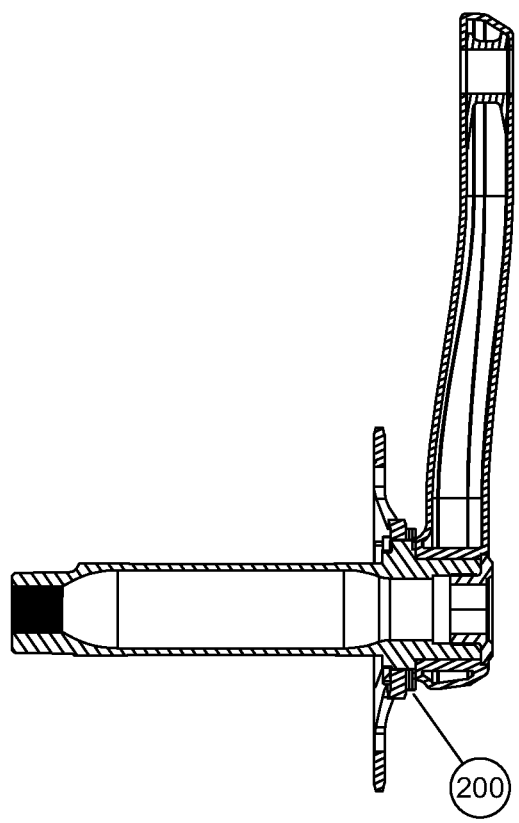
FIG. 22A illustrates a top section view of a right crank arm assembly in accordance with some embodiments.
Figure 22B:
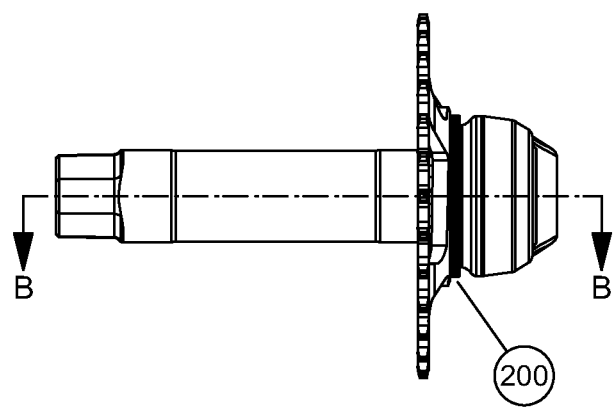
FIG. 22B illustrates a front view of a right crank arm assembly in accordance with some embodiments.

FIG. 20 shows a method of assembling either the left crank arm assembly 20 or right crank arm assembly 60. The method begins in the step 2002. In the step 2004 one or more bonding surfaces of an insert and a crank arm are cleaned. In the step 2006 adhesive is applied to one or more bonding surfaces of the insert and the crank arm and in the step 2008 the insert is slid into a receiving shape of the crank arm. In the step 2010 a fastener is installed into the insert through a hole in a crank arm. In the step 2012 torque is applied to the fastener and in the step 2014 the adhesive is cured. The method ends in the step 2016.

FIG. 21A-22B illustrate a right crank arm assembly in accordance with some embodiments. As shown within FIGS. 22A and 22B one or more spacers 200 are able to be used to adjust a chainline of a chain ring relative to the crank set. For example, in some embodiments, the one or more spacers 200 are able to comprise 1 mm spacers for adjusting the chainline.

As described above, during assembly of a right crank arm assembly 60, first an adhesive is applied to the right crank arm spindle torque coupling feature 74, and also applied to the right crank arm torque coupling feature 88. The right crank arm spindle torque coupling feature 74 is then inserted into the right crank arm torque coupling feature 88. Next the right crank arm attachment screw 62 is threaded into the right arm bolt threaded hole 80, and the screw is tightened until the necessary assembly torque is achieved in the fastener.

In some embodiments, the spindle insert insertion distance 192 is shorter than the right arm spindle pocket distance 194, such that when the screw is tightened, a compressive force is created in the right arm between the torque coupling feature stop face 75 and the right crank arm attachment screw flange pressure face 110.

Similarly, such as described above, during assembly of the left crank arm assembly 20, first adhesive is applied to the left crank arm torque coupling feature 156, and also applied to the left arm insert torque coupling feature 134. The left arm insert torque coupling feature 134 is then inserted into the left crank arm torque coupling feature 156. Next the left crank arm insert attachment screw 120 is threaded into the left arm spindle attachment insert internal thread 140, and the screw is tightened until some designated assembly torque is achieved in the fastener.

In some embodiments, the left arm insert insertion distance 196 is shorter than the left arm spindle pocket distance 198, such that when the screw is tightened, a compressive force is created in the left arm between the left arm outside counterbore pressure face 162 and the left arm insert stop face 161.

To assemble the cranks to the bicycle, first the left bottom bracket cup assembly 26 and the right bottom bracket cup assembly 28 are installed on the bicycle frame. Typically, these bottom bracket cup assemblies are threaded into the frame, or pressed into place, etc. Alternately bearings may be fitted directly into the frame using appropriately sized pockets in the bottom bracket assembly or analogous bicycle frame area.

Before installation on the bicycle, a chain ring 24 is installed on the crank spindle 22, and a chainring lock ring 25 is used to retain the chain ring 24 on the chainring attachment spline 76. The spindle is passed through the bottom bracket bearings so that the left crank arm spindle torque coupling feature 72 is exposed on the left side of the left bottom bracket cup assembly 26, and the right crank arm assembly 22 presses against the right inner race 46 of the right bottom bracket cup assembly 28. As shown, the chainring lock ring 25 contacts the right inner race 46, and acts as a stop for the right crank arm assembly 22.

Next, the left crank arm assembly 20 is attached to the crank spindle 22 using the crank fixing bolt 54. As shown, the crank/spindle assembly is a net fit between the left inner race 40 and the right inner race 46. In some embodiments of the invention the tolerance in the spindle interface may be taken up by a bearing preload device such as a wave spring, or a threaded preload mechanism, a compliant washer, or some other method.

In some embodiments, the left crank arm assembly 20 is attached to the crank spindle 22 through an integral attachment structure and the right crank arm assembly 60 is attached to a spindle insert, where the chain ring 24 is attached to the right crank arm assembly 60 and the demountable spindle interface is on the same side of the bicycle as the chain ring.

The composite bicycle crank with an integral spindle and attachment structure as described above and shown in the illustrations uses a round lobed spline as the interface between the spindle and the right arm structure, and between the bonded insert and the left arm structure. As will be understood by someone of ordinary skill in the art, the spline is able to comprise any number of other shapes, including a circular square or triangular shaped profile, a square toothed spline, and involute spline, a tri-lobe or four lobed polygon type shape, or any other straight geometric shape.

In some embodiments, the connection between the left crank arm assembly and the spindle could be a splined interface, a tapered square interface, or some alternative torque transmitting coupling.

Alternatively, in some embodiments, the interface between the spindle or insert and arm structures is able to be created with a taper to the shape from one end of the profile to the other, or a partial straight profile with a tapered profile on the lead-in end.

In further embodiments, a similar structure as is used to connect the crank arms to the spindle and inserts could be used to connect a pedal inset to a crank arms. In this embodiment, a shaped sleeve area would be molded or formed into the pedal end of the crank arm piece, and an insert and threaded fastener would be used to hold the insert in place, while the insert is bonded to the arm with adhesive. This could form a light-weight and strong interface between, for instance, a metal pedal insert and a plastic composite crank arm.

In some embodiments, the molded crank arm is constructed using any number of material molding or forming technologies. For instance, the arm could be formed using molded carbon-fibers in an epoxy resin or thermoplastic resin, short carbon or glass fibers injection molded using any number of moldable resins. The arms could also be forged or cast from light metal alloys, such as magnesium, aluminum or titanium and their alloys.

Alternatively in some embodiments, the crank arms could be made from a solid, low cost piece of reinforced plastic in order to make a low-cost crank assembly. In this embodiment a metal spindle or insert could be used to provide necessary strength where needed to the assembly.

In some embodiments, the hollow crank arms could be formed from two pieces of sheet metal, which would them be seam welded together to form a hollow structure, or bonded together. Alternatively a hollow arm structure could be composed of two pieces of dissimilar material and then bonded together to form a light hollow structure, which would then be bonded to the spindle and insert structures as described.

In further embodiments, two half-spindles are able to be substituted for the single full-length spindle in the preferred embodiment, with a torque transmitting connection included where the two half spindles meet near the centerline of the bicycle. In this embodiment the two spindle stubs would connect to the crank arms with the same structure described in the preferred embodiment.

In some embodiments, the crank assembly such as described above is used with a crank set comprising a toothed pulley for use with a belt drive. Alternatively, in the crank assembly such as described above is used with a gear or gear coupling for use with a gearbox drive to propel the bicycle.

In operation, the attachment method for the crank spindle to the drive side crank arm may be used for mounting either a spindle of the drive side crank spindle attachment, or to attach a de-mountable interface, as shown on the non-drive-side crank arm. Thus it is possible to make a single molded plastic composite arm for use on both the drive and non-drive side crank arms, rather than differently shaped arms for each side of the assembly. Consequently, a single mold is able to be used to form both arms, saving time and cost.

Another advantage of the novel composite bicycle crank with an integral spindle attachment structure is that it allows a hollow crank arm to be manufactured separately from the crank spindle, using different materials for each, and attaching them together after manufacture to create a structure that is lightweight and strong.

A further advantage of the novel composite bicycle crank with an integral spindle attachment structure is that it allows for hollow areas to be designed into a composite crank arm surrounding the attachment point for the spindle, resulting in a lighter and stronger finished product. Additionally, the composite bicycle crank with an integral spindle attachment structure separates the attachment point for a chainring or chainring spider from the crank arm structure, so that splined features and threads may be included on a spindle made of a suitable metal alloy, as threads and narrow splines are not easy to manufacture in plastic composite materials, but are easy to manufacture using suitable metal alloys. Moreover, in the case where the crank arm is manufactured from a plastic composite material, the area surrounding the spindle attachment may be formed without a metal insert, allowing the structure to be stronger and lighter than if an insert is molded into the structure during fabrication of the arm. As such, the composite bicycle crank with an integral spindle attachment structure as described herein has many advantages.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A bicycle crank arm comprising a round lobed spline interface configured for separately coupling with a right side of a crank spindle and a left side of the crank spindle of a bicycle through one of a spindle attachment structure unitarily formed on the crank spindle and a spindle attachment insert that is inserted into the bicycle crank arm, wherein the crank spindle insert engages a torque coupling feature of the bicycle crank arm, a crank arm attachment screw passes into the crank spindle insert and an externally threaded insert attachment screw engages internal threads of the crank spindle insert to retain the crank spindle insert within the bicycle crank arm, wherein the spindle attachment structure and the spindle attachment insert separately act as a direct interface between the crank spindle and the bicycle crank arm.

2. The bicycle crank arm of claim 1, wherein the crank arm comprises a right side crank arm.

3. The bicycle crank arm of claim 1, wherein the crank arm comprises a left side crank arm.

4. The bicycle crank arm of claim 1, wherein the crank arm is manufactured from a first material and the spindle insert is manufactured from a second material different than the first material.

5. The bicycle crank arm of claim 1, wherein the crank arm comprise a hollow structure.

6. A bicycle crank set comprising:
   a. a crank spindle comprising a crank spindle attachment structure unitarily formed on the crank spindle;
   b. a right side crank arm coupled to the crank spindle through a crank spindle insert inserted into the right crank arm, wherein the crank spindle insert engages a torque coupling feature of the right side crank arm, a crank arm attachment screw passes into the crank spindle insert and an externally threaded insert attachment screw engages internal threads of the crank spindle insert to retain the crank spindle insert within the right side crank arm, wherein the crank spindle insert comprises an integrally formed attachment structure, and wherein the crank spindle insert acts as a direct interface between the crank spindle and the right side crank arm; and
   c. a left side crank arm coupled to the crank spindle through the-unitarily formed crank spindle attachment structure, wherein the crank spindle insert and the unitarily formed crank spindle attachment structure comprise a same shaped attachment structure interface, and wherein the spindle attachment structure acts as a direct interface between the crank spindle and the left side crank arm.

7. The bicycle crank set of claim 6, wherein the right side crank arm couples to the crank spindle through one of a splined interface, a tapered square interface, and a torque transmitting coupling.

8. The bicycle crank set of claim 6, wherein the right side crank arm is manufactured from a first material and the spindle insert is manufactured from a second material different than the first material.

9. A bicycle crank set comprising:
   a. a crank spindle comprising a spindle attachment structure unitarily formed on the crank spindle, wherein the unitarily formed spindle attachment structure comprises a spindle attachment structure interface having a first shape;
   b. a first crank arm coupled to a first side of the crank spindle through the first shaped unitarily formed spindle attachment structure interface, wherein the spindle attachment structure acts as a direct interface between the crank spindle and the first crank arm; and
   c. a second crank arm comprising a crank spindle attachment insert inserted into the second crank arm, wherein the crank spindle insert engages a torque coupling feature of the second crank arm, a crank arm attachment screw passes into the crank spindle insert and an externally threaded insert attachment screw engages internal threads of the crank spindle insert to retain the crank spindle insert within the second crank arm, wherein the second crank arm is coupled to a second side opposite the first side of the crank spindle through the spindle attachment insert, wherein the spindle attachment insert comprises a spindle attachment structure interface having the first shape, and wherein the crank spindle insert acts as a direct interface between the crank spindle and the second crank arm.

10. The bicycle crank set of claim 9, wherein the first interface comprises a round lobed spline interface.

11. The bicycle crank set of claim 9, wherein the first interface comprises one of a circular interface, a square interface, a triangular interface, a square toothed spline, an involute spline, a tri-lobe polygon shape, a four-lobe polygon shape, and a geometric shape.

12. The bicycle crank set of claim 9, wherein the first crank arm comprises a right side crank arm and the second crank arm comprises a left side crank arm.

13. The bicycle crank set of claim 9, wherein the first crank arm comprises a left side crank arm and the second crank arm comprises a right side crank arm.

14. The bicycle crank set of claim 9, wherein the second crank arm is manufactured from a first material and the spindle attachment insert is manufactured from a second material different than the first material.

15. The bicycle crank set of claim 9, wherein the first crank arm couples to the crank spindle through one of a splined interface, a tapered square interface, and a torque transmitting coupling.

16. The bicycle crank set of claim 9, wherein the first crank arm is manufactured from a first material and the spindle attachment insert is manufactured from a second material different than the first material.

17. The bicycle crank set of claim 9, wherein the first crank arm comprises a first hollow structure and the second crank arm comprises a second hollow structure.

18. A bicycle crank set comprising:
   a. a crank spindle comprising a first side and a second side;
   b. a spindle attachment structure unitarily formed on the first side of the crank spindle, wherein the unitarily formed spindle attachment structure comprises a spindle attachment structure interface having a first shape, wherein the spindle attachment structure acts as a direct interface between the crank spindle and one of a first crank arm and a second crank arm;
   c. a crank spindle insert inserted into an opposite one of the first crank arm and the second crank arm from the spindle attachment structure, wherein the crank spindle insert engages a torque coupling feature of the opposite one of the first crank arm and the second crank arm, a crank arm attachment screw passes into the crank spindle insert and an externally threaded insert attachment screw engages internal threads of the crank spindle insert to retain the crank spindle insert within the opposite one of the first crank arm and the second crank arm, the crank spindle insert comprising a spindle attachment structure interface having the first shape, and for attaching one of the first crank arm and the second crank arm to the crank spindle second side and wherein the crank spindle insert acts as a direct interface between the crank spindle and one of the first crank arm and the second crank arm;

d. the first crank arm coupled to one of the first side and the second side of the crank spindle and through one of the unitarily formed attachment structure and the crank spindle insert; and e. the second crank arm coupled to one of the first side and the second side of the crank spindle and through one of the unitarily formed attachment structure and the crank spindle insert, on an opposite side from the first crank arm.

19. The bicycle crank set of claim 18, wherein the unitarily formed spindle attachment structure comprises a round lobed spline interface.

20. The bicycle crank set of claim 18, wherein the unitarily formed spindle attachment structure comprises one of a circular interface, a square interface, a triangular interface, a square toothed spline, an involute spline, a tri-lobe polygon shape, a four-lobe polygon shape, and a geometric shape.

21. The bicycle crank set of claim 18, wherein one of the first crank arm and the second crank arm couple to the crank spindle through one of a splined interface, a tapered square interface, and a torque transmitting coupling.

22. The bicycle crank set of claim 18, wherein one of the first crank arm and the second crank arm is manufactured from a first material and the spindle insert is manufactured from a second material different than the first material.

23. The bicycle crank set of claim 18, wherein the first crank arm and the second crank arm comprise a hollow structure.

24. The bicycle crank set of claim 18, further comprising one or more chain rings.

25. The bicycle crank set of claim 24, comprising one or more spacers for adjusting a chainline of the one or more chain rings.

* * * * *